United States Patent
Girardot et al.

(10) Patent No.: US 12,031,524 B2
(45) Date of Patent: Jul. 9, 2024

(54) WIND TURBINE CONTROL SYSTEM INCLUDING AN ARTIFICIAL INTELLIGENCE ENSEMBLE ENGINE

(71) Applicant: Inventus Holdings, LLC, Juno Beach, FL (US)

(72) Inventors: Andres F. Girardot, Jupiter, FL (US); George Alex Pantouris, Jupiter, FL (US); Yi Li, Jupiter, FL (US)

(73) Assignee: INVENTUS HOLDINGS, LLC., Juno Beach, FL (US)

( * ) Notice: Subject to any disclaimer, the term of this patent is extended or adjusted under 35 U.S.C. 154(b) by 424 days.

(21) Appl. No.: 17/410,911

(22) Filed: Aug. 24, 2021

(65) Prior Publication Data

US 2021/0381489 A1     Dec. 9, 2021

Related U.S. Application Data

(63) Continuation-in-part of application No. 17/327,352, filed on May 21, 2021, now Pat. No. 11,598,314,
(Continued)

(51) Int. Cl.
*F03D 7/04*     (2006.01)
*F03D 7/02*     (2006.01)
(Continued)

(52) U.S. Cl.
CPC ........... *F03D 7/046* (2013.01); *F03D 7/0224* (2013.01); *F03D 7/0276* (2013.01); *F03D 7/045* (2013.01);
(Continued)

(58) Field of Classification Search
None
See application file for complete search history.

(56) References Cited

U.S. PATENT DOCUMENTS 5,417,548 A    5/1995  Tangler et al.
6,957,623 B2  10/2005  Guisinger et al.
(Continued)

OTHER PUBLICATIONS

Bottasso, Carlo Luigi, et al. "LiDAR-enabled model predictive control of wind turbines with real-time capabilities." Renewable Energy 71 (2014): 442-452. (Year: 2014).*
(Continued)

*Primary Examiner* — Carlos R Ortiz Rodriguez
(74) *Attorney, Agent, or Firm* — TAROLLI, SUNDHEIM, COVELL & TUMMINO, LLP

(57) ABSTRACT

A system for generating power includes an environmental engine that determines performance metrics for a plurality of wind turbines deployed at a plurality of windfarms, such that each windfarm includes a corresponding subset of the plurality of windfarms. The performance metrics for a given wind turbine of the plurality of wind turbines characterizes wind flowing over blades of the given wind turbine. The system includes an artificial intelligence (AI) ensemble engine operating on the one or more computing devices that generates a set of models for each wind turbine of the plurality of wind turbines, wherein each model of each set of models is generated with a different machine learning algorithm and selects, for each respective set of models, a model with a highest efficiency metric. The AI engine provides edge computing systems operating at the plurality of windfarms with a selected model and corresponding recommended operating parameters.

20 Claims, 8 Drawing Sheets

Related U.S. Application Data which is a continuation of application No. 16/101,913, filed on Aug. 13, 2018, now Pat. No. 11,015,576.

(51) Int. Cl.
  *G05B 19/042* (2006.01)
  *G06N 20/00* (2019.01)
  *G06F 113/06* (2020.01)

(52) U.S. Cl.
  CPC .......... *G05B 19/042* (2013.01); *G06N 20/00* (2019.01); *F05B 2200/13* (2013.01); *F05B 2200/14* (2013.01); *F05B 2200/211* (2013.01); *F05B 2200/221* (2013.01); *F05B 2220/30* (2013.01); *F05B 2240/221* (2013.01); *F05B 2260/74* (2013.01); *F05B 2260/84* (2013.01); *F05B 2270/101* (2013.01); *F05B 2270/1033* (2013.01); *F05B 2270/32* (2013.01); *F05B 2270/323* (2013.01); *F05B 2270/324* (2013.01); *F05B 2270/325* (2013.01); *F05B 2270/402* (2013.01); *G05B 2219/2619* (2013.01); *G06F 2113/06* (2020.01)

(56) References Cited

U.S. PATENT DOCUMENTS

| | | | |
|---|---|---|---|
| 7,282,808 B2 | 10/2007 | Shibata et al. | |
| 7,726,935 B2 | 6/2010 | Johnson | |
| 8,306,772 B2 | 11/2012 | Cox et al. | |
| 9,734,447 B1 * | 8/2017 | Diev | G06N 5/045 |
| 9,926,906 B2 | 3/2018 | Mansberger | |
| 2008/0219850 A1 | 9/2008 | O'Connor et al. | |
| 2010/0283246 A1 | 11/2010 | Christensen | |
| 2011/0006525 A1 | 1/2011 | Cleve | |
| 2011/0123348 A1 | 5/2011 | Greenblatt | |
| 2012/0034082 A1 | 2/2012 | Stimm | |
| 2013/0030784 A1 | 1/2013 | Viassolo | |
| 2013/0184838 A1 | 7/2013 | Tchoryk, Jr. et al. | |
| 2013/0277970 A1 | 10/2013 | Dange et al. | |
| 2013/0280066 A1 | 10/2013 | Scholte-Wassink | |
| 2014/0193254 A1 | 7/2014 | Go Polan | |
| 2015/0308416 A1 | 10/2015 | Ambekar | |
| 2016/0333855 A1 | 11/2016 | Lund | |
| 2017/0058871 A1 | 3/2017 | Movsichoff | |
| 2018/0051675 A1 | 2/2018 | KJ R | |
| 2018/0058423 A1 | 3/2018 | Rmili | |
| 2018/0135593 A1 | 5/2018 | Shah et al. | |
| 2019/0042988 A1 | 2/2019 | Brown | |
| 2019/0072068 A1 | 3/2019 | Fisher | |
| 2019/0171187 A1 | 6/2019 | Cella | |
| 2019/0295000 A1 | 9/2019 | Candel | |

OTHER PUBLICATIONS

Syahputra, Ramadoni, Imam Robandi, and Mochamad Ashari. "Performance analysis of wind turbine as a distributed generation unit in distribution system." International Journal of Computer Science & Information Technology (IJCSIT) 6.3 (2014): 39-56. (Year: 2014).*

Tautz-Weinert, Jannis, and Simon J. Watson. "Using SCADA data for wind turbine condition monitoring—a review." IET Renewable Power Generation 11.4 (2017): 382-394. (Year: 2017).*

Stetco, Adrian, et al. "Machine learning methods for wind turbine condition monitoring: A review." Renewable energy 133 (2019): 620-635. (Year: 2019).*

Vogt, Stephan, et al. "Wind power forecasting based on deep neural networks and transfer learning." 18th Wind Integration Workshop. 2019. (Year: 2019).*

Deng, Shuiguang, et al. "Edge intelligence: The confluence of edge computing and artificial intelligence." IEEE Internet of Things Journal 7.8 (2020): 7457-7469. (Year: 2020).*

Justin Heinermann, et al., On Heterogeneous Machine Learning Ensembles for Wind Power Prediction, AAAI Workshop pp. 54-59, 2015.

A. Clifton et al., Using machine learning to predict wind turbine power output, Environ. Res. Lett. 8 024009, 2013.

Mathew, V., Toby, T., Singh, V., Rao, B.M. and Kumar, M.G., Dec. 2017. Prediction of Remaining Useful Lifetime (RUL) of turbofan engine using machine learning. In 2017 IEEE International Conference on Circuits and Systems (ICCS) (pp. 306-311). IEEE. (Year: 2017).

Singh, R.K. and Ahmed, M.R., 2013. Blade design and performance testing of a small wind turbine rotor for low wind speed applications. Renewable Energy, 50, pp. 812-819. (Year: 2013).

* cited by examiner

WIND TURBINE CONTROL SYSTEM INCLUDING AN ARTIFICIAL INTELLIGENCE ENSEMBLE ENGINE

CROSS-REFERENCE TO RELATED APPLICATIONS

This application is a continuation-in-part application of U.S. application Ser. No. 17/327,352 filed on 21 May 2021, which in turn is a continuation application of U.S. application Ser. No. 16/101,913 filed on 13 Aug. 2018, which issued as U.S. Pat. No. 11,015,576 on 25 May 2021, the entirety of each is incorporated herein by reference.

TECHNICAL FIELD

The present disclosure relates to power generation and more particularly to systems and methods for implementing artificial intelligence to select operational parameters of a wind turbine.

BACKGROUND

A wind turbine is a device that converts the wind's kinetic energy into electrical energy. Wind turbines are manufactured in a wide range of vertical and horizontal axes. The smallest wind turbines are used for applications such as battery charging for auxiliary power for boats or caravans or to power traffic warning signs. Slightly larger turbines can be used for making contributions to a domestic power supply while selling unused power back to the utility supplier via the electrical grid. Arrays of large turbines, known as windfarms, are used by many countries as part of a strategy to reduce reliance on fossil fuels.

A windfarm is a group of wind turbines in the same location used to produce electricity. A large windfarm may have several hundred individual wind turbines and cover an extended area of hundreds of square miles, and the land between the turbines may be used for agricultural or other purposes.

Machine learning is a subset of artificial intelligence in the field of computer science that employs statistical techniques to give computers the ability to "learn" (e.g., progressively improve performance on a specific task) with data, without being explicitly programmed.

A Reynolds number (Re) is an dimensionless quantity in fluid mechanics used to help predict flow patterns in different fluid flow situations. At low Reynolds numbers, flows tend to be dominated by laminar (sheet-like) flow, and at high Reynolds numbers turbulence results from differences in the fluid's speed and direction, which may sometimes intersect or even move counter to the overall direction of the flow (eddy currents). Such eddy currents begin to churn the flow, using up energy in the process, which for liquids increases the chances of cavitation.

SUMMARY

One example relates to a system for generating power. The system includes an environmental engine operating on one or more computing devices that determines performance metrics for a plurality of wind turbines deployed at a plurality of windfarms. Accordingly, each windfarm includes a corresponding subset of the plurality of windfarms. The performance metrics for a given wind turbine of the plurality of wind turbines characterizes wind flowing over blades of the given wind turbine that varies based on a wind speed of the given wind turbine. The system also includes an artificial intelligence (AI) ensemble engine operating on the one or more computing devices that generates a set of models for each wind turbine of the plurality of wind turbines, wherein each model of each set of models is generated with a different machine learning algorithm. The AI ensemble engine selects, for each respective set of models, a model with a highest efficiency metric and simulates execution of the selected model for each respective set of models to determine recommended operating parameters for each of the plurality of wind turbines. The AI ensemble engine provides edge computing systems operating at the plurality of windfarms with a selected model and the corresponding recommended operating parameters for each wind turbine in a corresponding subset of the plurality of wind turbines. The AI ensemble engine receives turbine operating data that characterizes operating conditions for a respective subset of the plurality of wind turbines.

Another example relates to a system for generating electric power. The system can include an environmental engine operating on one or more computing devices that determines performance metrics for a plurality of wind turbines deployed at a plurality of windfarms. Accordingly, each windfarm includes a corresponding subset of the plurality of windfarms. The performance metrics for a given wind turbine of the plurality of wind turbines characterizes wind flowing over blades of a respective wind turbine of the plurality of wind turbines that varies based on a wind speed of the respective wind turbine. The system also includes an AI ensemble engine operating on the one or more computing devices that generates a set of models for each wind turbine of the plurality of wind turbines, wherein each model of each set of models is generated with a different machine learning algorithm and selects, for each respective set of models, a model with a highest efficiency metric. The AI ensemble engine simulates execution of the selected model for each respective set of models to determine recommended operating parameters for each of the plurality of wind turbines. The system further includes a plurality of edge computing systems. Each edge computing system is proximal to a corresponding windfarm and each edge computing system instantiates a virtual turbine controller for each wind turbine in a corresponding subset of the plurality of wind turbines in response to receipt of models for each wind turbine in the subset of the plurality of wind turbines. Each virtual turbine controller has operating parameters that match operating parameters of a corresponding turbine controller coupled to a corresponding wind turbine of the plurality of wind turbines.

Yet another example relates to a method for controlling a system for generating electric power. The method includes determining, by an environmental engine operating on one or more computing devices, performance metrics for a plurality of wind turbines deployed at a plurality of windfarms. Accordingly each windfarm includes a corresponding subset of the plurality of windfarms. The performance metrics for a given wind turbine of the plurality of wind turbines characterizes wind flowing over blades of the given wind turbine that varies based on a wind speed of the given wind turbine. The method also includes generating, by an AI ensemble engine operating on the one or more computing devices, a set of models for each wind turbine of the plurality of wind turbines, wherein each model of each set of models is generated with a different machine learning algorithm. The method further includes selecting, by the AI ensemble engine, for each respective set of models, a model with a highest efficiency metric and simulating, by the AI ensemble engine, execution of the selected model for each respective set of models to determine recommended operating parameters for each of the plurality of wind turbines. The method still further includes receiving, at a plurality of edge computing systems that are each proximal to a corresponding windfarm, a selected model and corresponding recommended parameters for each wind turbine in a corresponding subset of the plurality of wind turbines. The method yet further includes instantiating, by each edge computing system, a virtual turbine controller for each wind turbine in the corresponding subset of the plurality of wind turbines in response to receipt of models for each wind turbine in the corresponding subset of the plurality of wind turbines. Each virtual turbine controller has operating parameters that match operating parameters of a corresponding turbine controller coupled to a corresponding wind turbine of the plurality of wind turbines.

DETAILED DESCRIPTION

Figure 1:
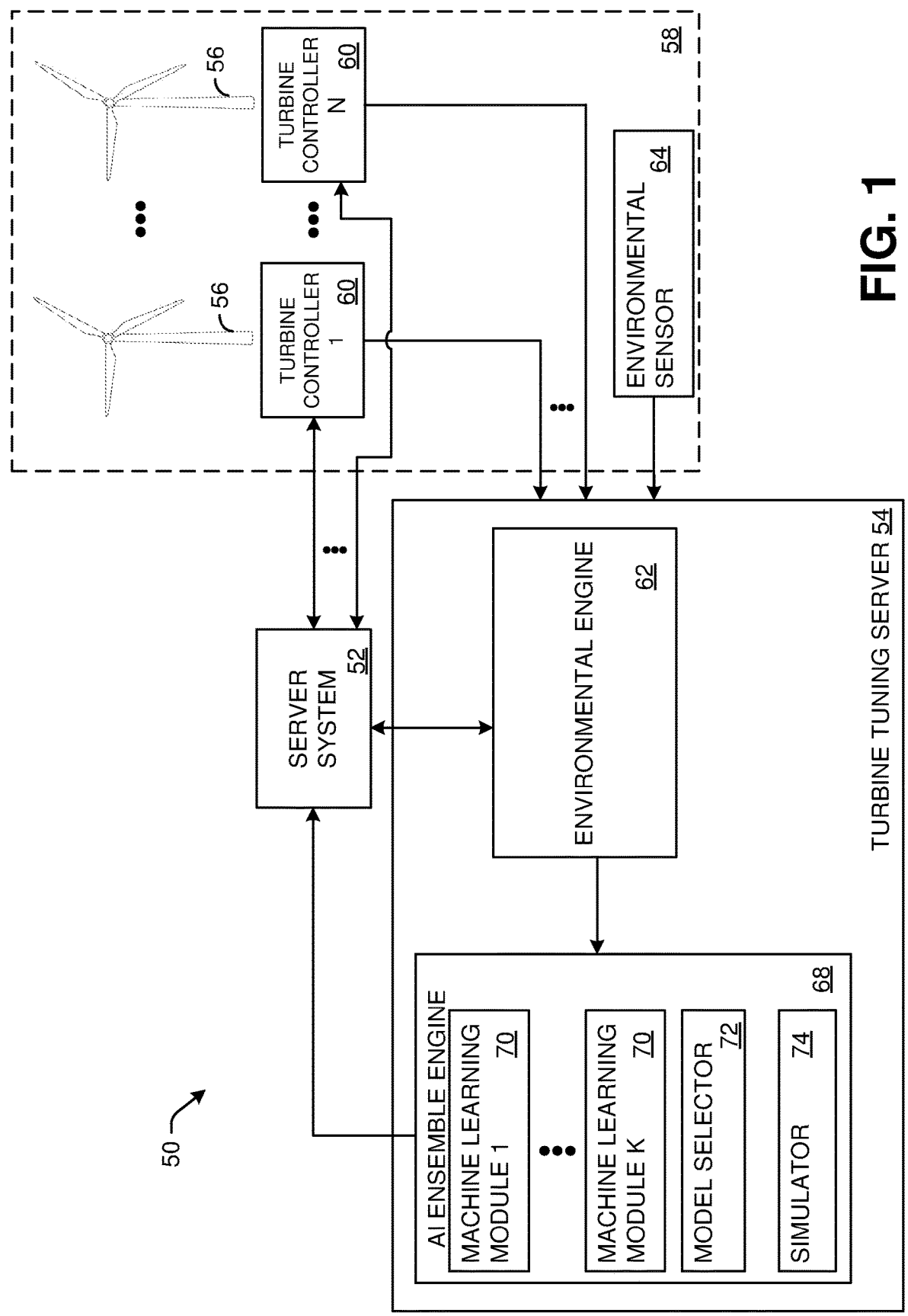
FIG. 1 illustrates a block diagram of an example of an electric generation system with a turbine tuning server that can tune operating parameters of wind turbines.

This disclosure relates to systems and methods for controlling a wind turbine (a generator) or multiple wind turbines to elevate an aerodynamic efficiency of the wind turbine, which in-turn elevates the power generated by the wind turbine. The system implements an artificial intelligence (AI) ensemble engine with multiple AI algorithms to continuously monitor and update recommended operating parameters for the wind turbine to elevate power generation of the wind turbine (or multiple wind turbines).

The system includes an environmental engine that employs ambient conditions around the wind turbine, mechanical information related to the wind turbine, turbine operating data for the wind turbine and other physical parameters to calculate a Reynolds number for the wind turbine. The Reynolds number numerically characterizes the wind flowing over the blades of the wind turbine. The ambient conditions can include wind speed, temperature, pressure and relative humidity near the wind turbine. Moreover, the mechanical information related to the wind turbine employed by the environmental engine can include blade length span, blade chords, blade profile and blade twist of the wind turbine. The turbine operating data of the wind turbine, such as rotor speed, generated power and blade pitch can be provided from a wind turbine controller. As used herein, the term "blade pitch" or "pitch" refers to an adjustment of an angle a blade moves through the air (angle of attack) such as blades of a large rotor (wind turbine, helicopter, etc.) moving into or out of the wind to control the production or absorption of power. Wind turbines can employ pitch to adjust aerodynamic torque and generate power. The other physical parameters employed by the environmental model can be related to the air around the wind turbine such as the gas constant for dry air, the gas constant of water vapor and pressure. By employing ambient conditions around the wind turbine, mechanical information related to the wind turbine, operating measurements and the other physical parameters, the Reynolds Number for the wind turbine can be accurately calculated.

The AI ensemble engine uses the calculated Reynolds Number provided from the environmental engine in addition to operating parameters included in the turbine operating data for the wind turbine (namely, a wind speed, blade pitch and rotor speed for the wind turbine) provided by the wind turbine controller to learn and model the relationship of the Reynolds Number and the operating parameters relative to generated power. As one example, the AI ensemble engine evaluates six (6) different machine learning algorithms concurrently and selects the AI model that provides the best ratio of accuracy and computational resource cost for calculating simulating execution of the wind turbine. In other examples, more or less machine learning algorithms could be employed. Such six (6) AI algorithms available on the AI ensemble engine include Deep Learning, Random Forest, Gradient Boost Tree, Decision Tree, K Nearest Neighbor, and Linear Regression.

Upon selection of the model, the AI ensemble engine employs a simulator to simulate operation of the wind turbine with a range of variations from the environment and the control parameters. The highest performing operating conditions in the simulation; those that show an increase in power generation for a different number of environmental conditions, are selected and provided as recommended operating parameters for the wind turbine.

Additionally, rather than simply maximizing power generation, the simulator of the AI ensemble engine can be programmed to balance a plurality of competing interests, including but not limited to the power generation, component reliability and/or power sales price. For example, the benefit of increased power may in some situations be outweighed by a likelihood of component failure. In such a situation, the recommendations selected by the AI engine may set the wind turbine to operate the wind turbine in a manner that elevates power generation without significantly impacting the likelihood that a component of the wind turbine will fail.

A server system employs the information from the environmental model and the recommendations from the AI engine to update the operating parameters of the wind turbine controller, and in turn, the wind turbine controller changes the operating parameters of the wind turbine. The turbine operating data of the wind turbine is re-measured and fed back into the environmental engine and the AI ensemble engine such that the system operates as a learning feedback loop that continuously tunes the AI ensemble engine to increase accuracy of the machine learning algorithms. By controlling the operating parameters of the wind turbine in this manner, power generation of the wind turbine can be elevated due to an increase in aerodynamic efficiency of the wind turbine.

In some examples, the system can be implemented on a portable system that can be attached to an individual wind turbine in a windfarm. Additionally, in other examples, the system is scalable to control the operation of individual wind turbines in a windfarm, and/or multiple windfarms. In fact, the process is scalable to control the operation of 1000 or more wind turbines. Moreover, the AI engine can translate complex recommendations into a series of rules that can be directly downloaded to the portable device.

FIG. 1 illustrates an electric power generation system 50 that includes a server system 52 and a turbine tuning server 54. The server system 52 can be implemented as a computing device, such as one or more servers that execute application software on top of an operating system. That is, the server system 52 may be implemented as a combination of hardware and software. The server system 52 is configured to send control commands that control N number of wind turbines 56 that form a windfarm 58, where N is an integer greater than or equal to one (1). In some examples, the server system 52 can be controlled by a third party, such as an original equipment manufacturer (OEM) of the N number of wind turbines 56. In other examples, the server system 52 can be implemented as a SCADA system (supervisory control and data acquisition system). In still other examples, the server system 52 can be representative of a combination of a third party server and a SCADA system operating in concert. The commands are sent to N number of turbine controllers 60 that are each connected to a respective wind turbine 56. The windfarm 58 is coupled to a power grid, and an output power level of the windfarm 58 may be monitored by a substation meter. In this manner, the N number of wind turbines 56 generate power that is provided to the power grid.

The turbine tuning server 54 can also be implemented as a computing device, such as one or more servers that execute application software on top of an operating system. That is, the turbine tuning server 54 may be implemented as a combination of hardware and software that is designed to calculate operating parameters of the N number of wind turbines 56 to elevate power generation and/or reduce maintenance costs of the N number of wind turbines 56. In some examples, the server system 52 and the turbine tuning server 54 can communicate over a network (e.g., a utility network). In other examples, the server system 52 and the turbine tuning system 54 can be integrated and operate on the same computing system.

As noted, each of the N number of wind turbines 56 is coupled to a corresponding turbine controller 60. Each turbine controller 60 controls the operation of the corresponding wind turbine 56. In particular, each turbine controller 60 turns the corresponding wind turbine 56 on and off in response to a request from the server system 52. Further, each turbine controller 60 can control operating parameters of the wind turbines 56, such as blade pitch, rotor speed, cut-in speed, cut-out speed, etc. Additionally, each turbine controller 60 can provide turbine operating data to the server system 52 that identifies (among other things) an operational state (e.g., on, off, rotor speed, blade pitch, power output, etc.) of the corresponding wind turbine 56. Each turbine controller 60 could be implemented, for example, as a programmable logic controller (PLC). The server system 52 can provide commands to each of the N number of turbine controllers 60 to change the operating parameters of the corresponding wind turbine 56. In response, the turbine controller 60 updates the operating parameters of the corresponding wind turbine 56.

The turbine tuning server 54 can include an environmental engine 62 (which may also be referred to as an environmental model) that can be representative of a software module executing on the turbine tuning server 54. The environmental engine 62 can also receive the turbine operating data from the N number of wind turbines 56. In some examples, the environmental engine 62 can receive the turbine operating data from the turbine controllers 60, and in other examples, the environmental engine 62 can receive the turbine operating data from the server system 52.

The windfarm 58 can include an environmental sensor 64 that can detect environmental conditions of the windfarm 58. The environmental sensor 64 can be representative of a plurality of environmental sensors. The environmental sensor 64 can measure ambient conditions such as wind speed, temperature, pressure and relative humidity of the windfarm 58. The environmental sensor 64 can provide measured environmental data to the environmental engine 62 that characterizes the measured ambient conditions of the windfarm 58. In some examples, environmental sensor 64 can be located and operated on an external system, such as a meteorological station (e.g., weather station) in relatively close proximity (e.g., up to about 20 kilometers) from the windfarm 58.

The environmental engine 62 can be programmed with and/or receive mechanical data characterizing mechanical properties of each of the N number of wind turbines 56. The mechanical properties can characterize blade properties of the wind turbines 56, such as the blade span, airfoil profiles, chord lengths and/or twist of the blades. The environmental engine 62 can employ the turbine operating data, the measured environment data and the mechanical data and other predetermined characteristics of the air of the windfarm 58 (e.g., gas constant for dry air, the gas constant of water vapor and pressure, etc.) to generate a Reynolds number characterizing the wind flowing over the blades of each of the N number of wind turbines 56. More specifically, the Reynolds number discretizes an airfoil profile in multiple sections and computes an average ratio across a span of a blade on a wind turbine. In this manner, the Reynolds number for each of the N number of wind turbines 56 characterizes a relationship between the blade performance of each wind turbine 56 and the power generated by each wind turbine 56. The Reynolds number for each of the wind turbines 56 can be based on wind speed, rotor speed and characteristics of the blade of the corresponding wind turbine 56. As an example, such characteristics can include, but are not limited to, blade span, blade aerodynamic profiles, blade chords and a blade twist profile.

In some examples, the environmental engine 62 can be programmed to calculate a turbulence intensity for each of the N number of wind turbines 56. The turbulence intensity can vary based on a wind speed at a hub height of the corresponding wind turbine 56. As used herein, the term "hub height" can define a height of a rotor of a wind turbine.

The environmental engine 62 can provide the Reynolds number and the turbulence intensity for each wind turbine 56 to an artificial intelligence (AI) ensemble engine 68. The AI ensemble engine 68 can operate as a software module of the turbine tuning server 54. Further, it is understood that although the system 50 depicts the environmental engine 62 and the AI ensemble engine 68 as operating on the same computing system (the turbine tuning server 54), in other examples, the AI ensemble engine 68 and the environmental engine 62 can operate on separate systems that communicate via a network.

The AI ensemble engine 68 can include K number of machine learning modules 70, where K is an integer greater than or equal to three (3). Each of the K number of machine learning modules 70 can implement a different type (e.g., algorithm) of machine learning. As one example, there could be six (6) machine learning modules 70. In such a situation, the K machine learning modules 70 can implement Deep Learning, Random Forest, Gradient Boost Tree, a Decision Tree Process, K Nearest Neighbor and Linear regression. In other examples, a subset of these machine learning techniques can be employed.

Each machine learning module 70 can output a model (e.g., a numerical model) that characterizers a mathematical approximation for operating each of the N number of wind turbines 56. In some examples, each model output by the K number of learning modules 70 can characterize a relationship between rotor speed, blade pitch, the Reynolds number and the turbulence intensity for each of the N number of wind turbines 56. However, in other examples, the model can characterize the relationship between more or less parameters and/or ambient conditions. The AI ensemble engine 68 can include a model selector 72 (e.g., software module) that evaluates the model generated by each of the K number of machine learning modules 70 to estimate an accuracy and a computational resource cost for each model.

The accuracy represents an expected accuracy (corresponding to an error rate) of each model during a simulation relative to real world performance. The computational resource cost of each model represents an estimate of a time consumed to deliver x-fold (e.g., 5-fold) split validation averaged under for a fixed hardware allocation (e.g., memory use, central processing unit (CPU) cycles, graphic processing cycles (GPU), etc.). The model selector 72 can select the model with a highest efficiency metric that corresponds to a ratio between the estimated accuracy and computational resource cost of each model output by the K number of machine learning modules 70.

The selected model can be provided to a simulator 74 of the AI ensemble engine 68. The simulator 74 can execute multiple simulations of the N number of wind turbines 56 with various parameters based on the Reynolds number for each wind turbine 56, operation data and on the environmental data. Additionally, the simulator 74 can execute simulations by varying the environmental parameters (characterized in the environmental data) and the operating conditions to determine a set of recommended operating parameters for each of the N number of wind turbines 56.

The set of recommended operating parameters for each of the N wind turbines 56 can include blade pitch and rotor speed of the N number of wind turbines 56 (or a plurality of combinations of blade pitch and rotor speed) that balances a plurality of competing interests. For example, the recommended operating parameters can provide an elevated power generation for a relatively wide range of environmental parameters balanced against a likelihood of failure of mechanical features of each wind turbine 56 and/or power sales price. As one example, the recommended operating parameters are selected to operate each wind turbine 56 in a manner that elevates power generation without offsetting the increased power generation with increased maintenance costs.

As one example, it is presumed that a given set of operating parameters predicts an increase in power generation of a given wind turbine 56 by about 3%, but also predicts an increase wear on the given wind turbine 56 in a manner that would increase the likelihood of mechanical failure of a specific component (e.g., a pitch motor) by 20%. Continuing with this example, it is presumed that another set of operating parameters for the given wind turbine 56 predicts that the power generation for the given wind turbine 56 would be increased by about 2%, and would increase the likelihood of a mechanical failure of the specific component by about 0.5%. In this example, the other set of operating parameters may be selected by the simulator 74 as the recommended operating parameters for the given wind turbine 56 over the given operating parameters. However, the simulator 74 can consider many other factors such as sale price of generated power for generating the recommended operating parameters for each wind turbine 56.

The recommended operating parameters for each of the N number of wind turbines 56 can be provided to the server system 52. The server system 52 can upload the recommended operating parameters for each of the N number of wind turbines 56 at an appropriate time (e.g., during a downturn in wind and/or periodically) to each turbine controller 60. In response, each turbine controller 60 can change the operating parameters to the recommended operating parameters.

Additionally, each turbine controller 60 continues to provide updated turbine operating data for the corresponding wind turbine 56 to the turbine tuning server 54. In response, the environmental engine 62 can update the Reynolds number for each of the wind turbines 56 (or some subset thereof). Additionally, data such as the power output by each wind turbine 56 can be employed by each machine learning module 70 and/or the simulator 74 of the AI ensemble engine 68 to update each generated model and the simulation of the selected model. For example, if the recommended operating parameters for a given wind turbine 56 predicted an increase of power generation of about 3%, but the turbine operating data for the given wind turbine 56 indicates that power generation actually decreased, the simulator 74 and the machine learning module 70 that generated the selected model can be updated to reflect the updated measured conditions.

Upon updating the simulator 74 and/or each machine learning module 70 (or some subset thereof), the model selector 72 can re-execute the selection of a model, and the simulator 74 can generate an updated set of recommended operating parameters for each wind turbine 56 that can be provided to the server system 52 for uploading to each of the N number of turbine controllers 60. In this manner, performance (e.g., predicted accuracy) of the AI ensemble engine 68 improves over time through the employment of feedback.

By employment of the system 50, the operating parameters of each of the N number of wind turbines 56 can be selected to a level that elevates power generation without unnecessarily increasing maintenance costs of the windfarm 58. That is, the operating parameters of the N number of wind turbines 56 can be tuned to enhance the operation of the N number of wind turbines 56.

Additionally, as described herein, the system 50 can be implemented for multiple windfarms 58. Further, in some examples, the turbine tuning server 54 can be implemented on a portable unit (e.g., a mobile computing device) and connected to a single wind turbine controller 60. In this manner, the turbine tuning server 54 can be employed to tune the operating parameters for a single wind turbine 56.

Figure 2:
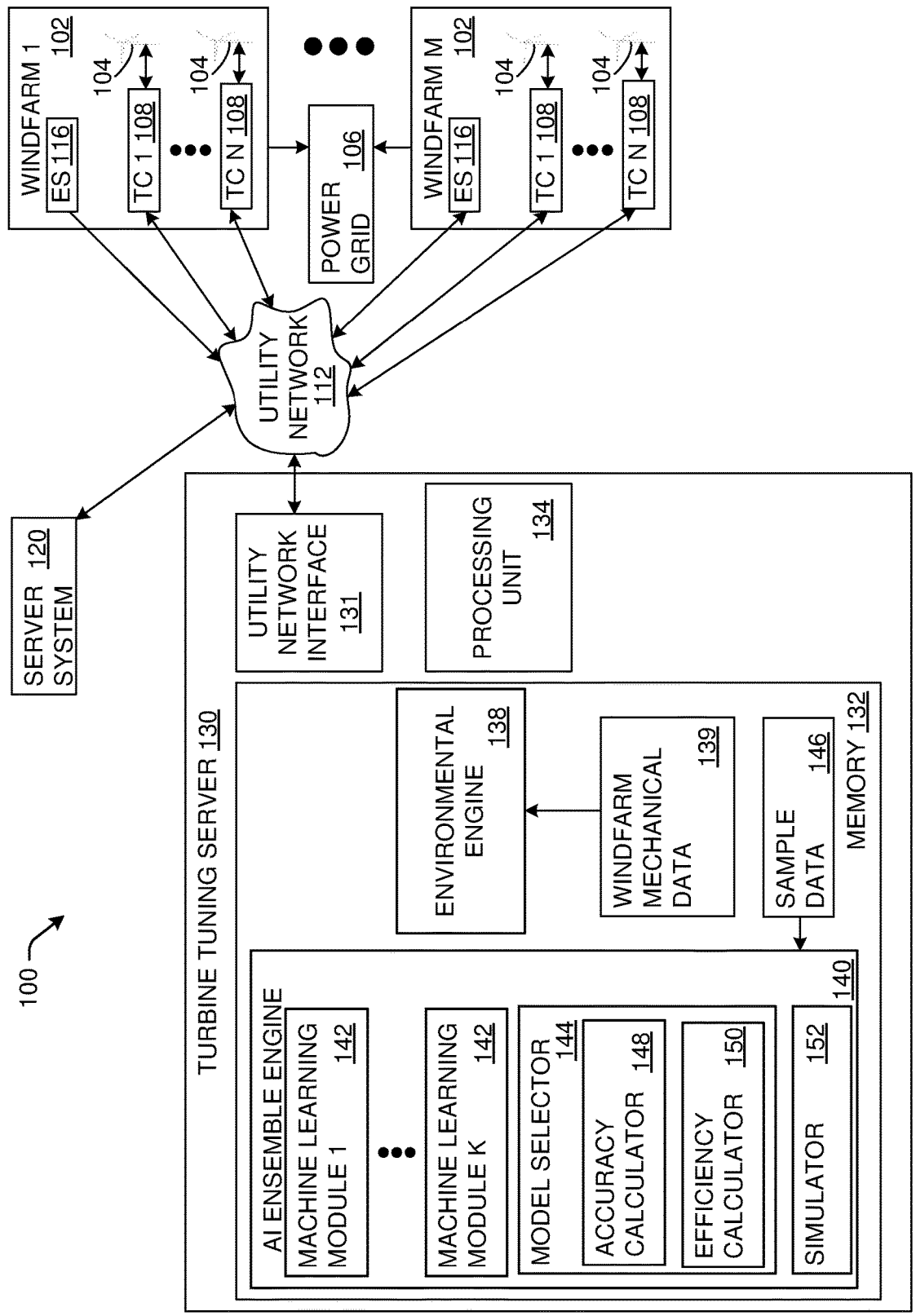
FIG. 2 illustrates another block diagram of an example of an electric generation system that includes a turbine tuning server that can tune operating parameters of wind turbines.

FIG. 2 illustrates another example of an electric power generation system 100 that can tune the operating parameters of wind turbines. The electric power generation system 100 can include M number of windfarms 102 that can generate electric power, where M is an integer greater than or equal to one. Each of the M number of windfarms 102 can include N number of wind turbines 104. Each of the M number of windfarms 102 can be implemented in a manner similar to the windfarm 58 of FIG. 1. Moreover, each of the M number of windfarms 102 can have a different (or the same) number of wind turbines. For purposes of simplicity of explanation, each wind turbine 104 can be associated with an index number that can uniquely identify the wind turbine 104 with a windfarm number and a wind turbine number. For instance, the first wind turbine 104 in the first windfarm 102 can be referenced as wind turbine (1,1). Similarly, the Nth wind turbine 104 of the Mth windfarm 102 can be referenced as wind turbine (M, N). Accordingly, each of the M number of windfarms 102 can include a subset of the total number of wind turbines 104 grouped together in geographic proximity.

Each of the M number of windfarms 102 can provide power to a power grid 106. For purposes of simplification of explanation, power distribution infrastructure such as inverters, substations, feeders and transformers are omitted from view.

Each windfarm 102 can include N number of turbine controllers (TC) 108. Accordingly, each turbine controller 108 can be assigned the same index number as the corresponding wind turbine. Therefore, the Nth turbine controller 108 of the Mth windfarm 102 can be referenced as turbine controller (M, N). Each turbine controller 108 can be implemented, for example, as a PLC. Each turbine controller 108 can transmit turbine operating data communicably coupled to a utility network 112. The turbine operating data can include data characterizing an operational state of the corresponding wind turbine 104, such as on, off, rotor speed, blade pitch, power output, etc.

The utility network 112 can be a communications network. The utility network 112 can be a public network (e.g., the Internet), a private network (e.g., a proprietary network) or a combination thereof (e.g., a private network coupled to the Internet). The utility network 112 can provide bi-directional communication between nodes of the utility network 112.

Each windfarm 102 can also include an environmental sensor (ES) 116 that can be representative of a plurality of environmental sensors 116. Each environmental sensor 116 can measure ambient conditions for a corresponding windfarm 102, such as wind speed, temperature, pressure and relative humidity. Each environmental sensor 116 can output measured environmental data that characterizes the measured ambient conditions of the corresponding windfarm 102 to other nodes on the utility network 112.

In some examples, the environmental sensors 116 can be representative of sensors external to the corresponding windfarm 102. For instance, in some examples, the environmental data can be provided from a nearest meteorological station (weather station) that manages the environmental sensors 116.

The electric power generation system 100 can include a server system 120 that communicates on the utility network 112. The server system 120 can be representative of a server operated by a third party, such as an OEM of the wind turbines 104. Alternatively, the server system 120 can be representative of a SCADA system. In still other examples, the server system 120 can be representative of a combination of a third party server and a SCADA system operating in concert. The server system 120 can receive the turbine operating data from the turbine controller 108 and the environmental data from the environmental sensors 116. The server system 120 can provide commands to each of the turbine controllers 108 to change operating parameters of the corresponding wind turbines 104 (e.g., on, off, rotor speed, blade pitch, etc.). In response, each turbine controller 108 updates the operating parameters of the corresponding wind turbine 104. Moreover, although the example electric power generation system 100 illustrates a single server system 120, in other examples, multiple server systems 120 can be employed. For instance, each windfarm 102 can have a local server system.

A turbine tuning server 130 (e.g., a computer system) can also be connected to the utility network 112 via a utility network interface 131 (e.g., a network interface card). The turbine tuning server 130 can be implemented by a utility provider (e.g., a power provider), such as a utility provider that controls the M number of windfarms 102. The turbine tuning server 130 can include memory 132 to store machine executable instructions. The memory 132 can be implemented as a non-transitory machine readable medium. The memory 132 could be volatile memory (e.g., random access memory), non-volatile memory (e.g., a hard drive, a solid state drive, flash memory, etc.) or a combination thereof. The turbine tuning server 130 can include a processing unit 134 (e.g., one or more processor cores) that accesses the memory 132 and executes the machine readable instructions.

In some examples, the turbine tuning server 130 can be (physically) implemented at facilitates controlled by the utility provider. In such a situation, the turbine tuning server 130 could be representative of multiple servers (e.g., a server farm). Additionally or alternatively, the turbine tuning server 130 (or a portion thereof) can be implemented in a remote computing system, such as a computing cloud. In such a situation, features of the turbine tuning server 130, such as the processing unit 134, the utility network interface 131, and the memory 132 could be representative of a single instance of hardware or multiple instances of hardware with applications executing across the multiple of instances (i.e., distributed) of hardware (e.g., computers, routers, memory, processors, or a combination thereof). Alternatively, the turbine tuning server 130 could be implemented on a single dedicated computing device.

The memory 132 stores application software for tuning operations of the each of the wind turbines 104 in the M number of windfarms 102. For example, the memory 132 stores application software for monitoring, analyzing and determining recommended operating parameters for each of the wind turbines 104 in a manner described herein.

The memory 132 includes an environmental engine 138 executing thereon. The environmental engine 138 can receive windfarm mechanical data 139 that characterizes mechanical properties of each of the N number of wind turbines 104 in each of the windfarms 102. The mechanical properties can include, for example, blade properties of each wind turbine, including blade span, airfoil profiles, chord lengths, and/or twist angle of the blades. Additionally, the environmental engine 138 can receive the measured environmental data provided from the M number of environmental sensors 116 characterizing the ambient conditions of each of the windfarms 102. Further, the environmental engine 138 can receive the turbine operating data from the turbine controllers 108 characterizing the operational state of each of the wind turbines 104.

The environmental engine 138 can generate a mathematical model characterizing the ratio of inertial to viscous forces that are interacting with a surface of airfoils of a wind turbine 104. More particularly, the environmental engine 138 can employ the turbine operating data, the measured environmental data, the windfarm mechanical data and other predetermined characteristics of each of the M number of windfarms 102 (e.g., gas constant for dry air, the gas constant of water vapor and pressure, etc.) to generate a Reynolds number for each of the wind turbines 104. It is noted that in examples where the rotor speed for a particular wind turbine 104 is unmeasurable, the environmental engine 138 can calculate an estimated rotor speed based on a measured generator speed (which can be included in the turbine operating data) and a gearbox ratio (which can be included in the mechanical properties) for the wind turbine 104.

The aerodynamic performance of an airfoil profile of a blade of the wind turbines 104 depends on characteristics of air flow. To quantify the characteristics of the airflow at the interaction with the surface of the airfoil, the environmental engine 138 calculates a Reynolds number for each given wind turbine 104 that numerically characterizes the wind flowing over the blades at the given wind turbine 104. The Reynolds number can be employed to establish a quantified relationship between the aerodynamic torque generated by the blades on the given wind turbine 104 and the power generated by the given wind turbine. As one example, the Reynolds number, Re for each wind turbine 104 can be calculated with Equation 1. As discussed below, Equations 2-4 define variables in Equation 1.

$$Re = \frac{\rho}{N\mu} \Sigma_{i=1}^{N} W_i C_i \quad \text{Equation 1}$$

Wherein:
Re is the Reynolds number of the wind turbine;
N is the number of profile sections for a blade of the wind turbine;
$\rho$ is the local air density (kg/m$^3$) for the wind turbine;
$\mu$ is the air dynamic viscosity (kg/(m*s))
$W_i$ is the apparent wind speed for blade section i of the wind turbine (m/s); and
$C_i$ is the local chord length for the blade section i of the wind turbine (m).

Figure 3:
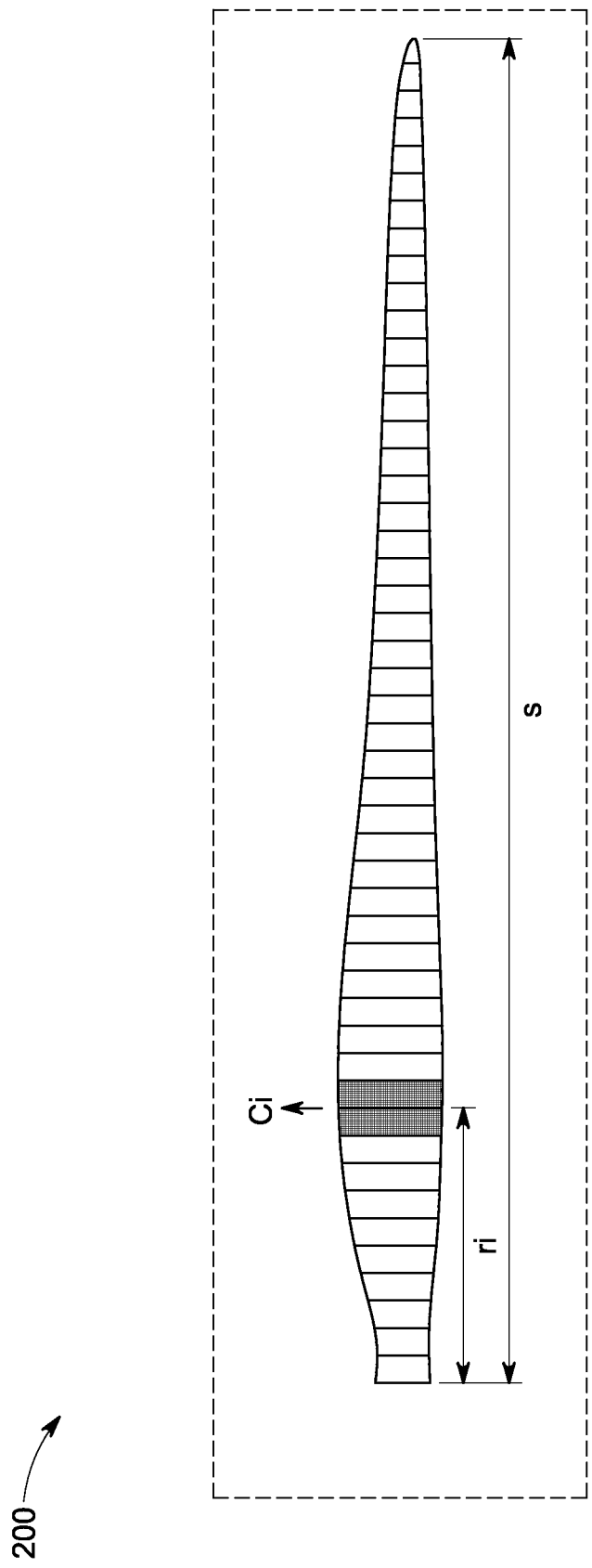
FIG. 3 illustrates an example of a airfoil profile of a blade of a wind turbine.

The chord length of the bade of the wind turbine varies a function of blade span. More particularly, the number of profile sections for each wind turbine 104 is based on an airfoil profile or multiple airfoil profiles that varies based on the windfarm mechanical data 139 (mechanical properties) for the corresponding wind turbine 104. Moreover, FIG. 3 illustrates a diagram 200 depicting one instance of a local cord length $C_i$ with a specific airfoil profile. That is, the chord length varies as a function of blade span. In FIG. 3, the total span (length) of the blade is defined as 'S'. Additionally, the distance from a root (end) to the local chord, $C_i$ is define as a distance from root, or "root distance", $r_i$ for the local cord length $C_i$. As demonstrated in the diagram 200, the chord length $C_i$ varies as a function of root distance, $r_i$.

Referring back to FIG. 2, the apparent wind speed, $W_i$ for blade section i of the wind turbine 104 and is defined by Equation 2.

$$W_i = \sqrt{u^2 + (r_i \omega)^2} \quad \text{Equation 2}$$

Wherein:
$\mu$ is the measured wind speed (m/s) at the wind turbine;
$\omega$ is the rotor speed for the wind turbine (rad/s); and
$r_i$ is the ith blade section root distance (m).

The local air density, $\rho$ (kg/m$^3$) for the wind turbine 104 can be calculated with Equation 3 using measured environmental data from the corresponding windfarm 102:

$$\rho = \frac{1}{T}\left[\left(\frac{B}{R_0}\right) - \varphi P_w\left(\frac{1}{R_0} - \frac{1}{R_W}\right)\right] \quad \text{Equation 3}$$

Wherein:
T is a measured absolute air temperature (K);
B is a measured air pressure correct to a hub height average (Pa);
$R_0$ is the gas constant for dry air ($\approx$287.05 J/KgK)
$\varphi$ is the measured relative humidity; and
$P_w$ is the vapor pressure, equal to 0.0000205 $e^{0.0631846*T}$ (Pa).

The dynamic air viscosity, $\mu$ can be calculated by Equation 4:

$$\mu = \frac{(1.458 \times 10^{-6})T^{3/2}}{(T + 110.4)} \quad \text{Equation 4}$$

Additionally, in some examples, the environmental engine 138 can be programmed to calculate a turbulence intensity for each of the N number of wind turbines 104 in each of the M number of windfarms 102. The turbulence intensity can vary based on a wind speed at a hub height of the corresponding wind turbine 102. More particularly, the turbulence intensity, TI for each of the wind turbines 104 can be calculated by Equation 5:

$$TI = \frac{V_{hh,stdev}}{V_{hh,avg}} \quad \text{Equation 5}$$

Wherein:
TI is the turbulence intensity at the wind turbine;
$V_{hh,avg}$ is the average wind speed for the wind turbine at hub height; and
$V_{hh,stdev}$ is the wind speed at hub height at one standard deviation greater than the average wind speed for the wind turbine.

The Reynolds number for each wind turbine 104 and the turbulence intensity can be provided to an AI ensemble engine 140 executing in the memory 132. The AI ensemble engine 140 can include K number of machine learning modules 142 that each generate a model characterizing the performance of the M number of windfarms 102. Each of the K number of machine learning modules 142 can implement a different type of machine learning technique (e.g., a different machine learning algorithm). As one example, there can be six (6) machine learning modules 142 that execute respective machine learning algorithms, including but not limited to Deep Learning, Random Forest, Gradient Boost Tree, a Decision Tree Process, K Nearest Neighbor and Linear Regression. In other examples, a subset or superset of these machine learning techniques could be employed.

Figure 4:
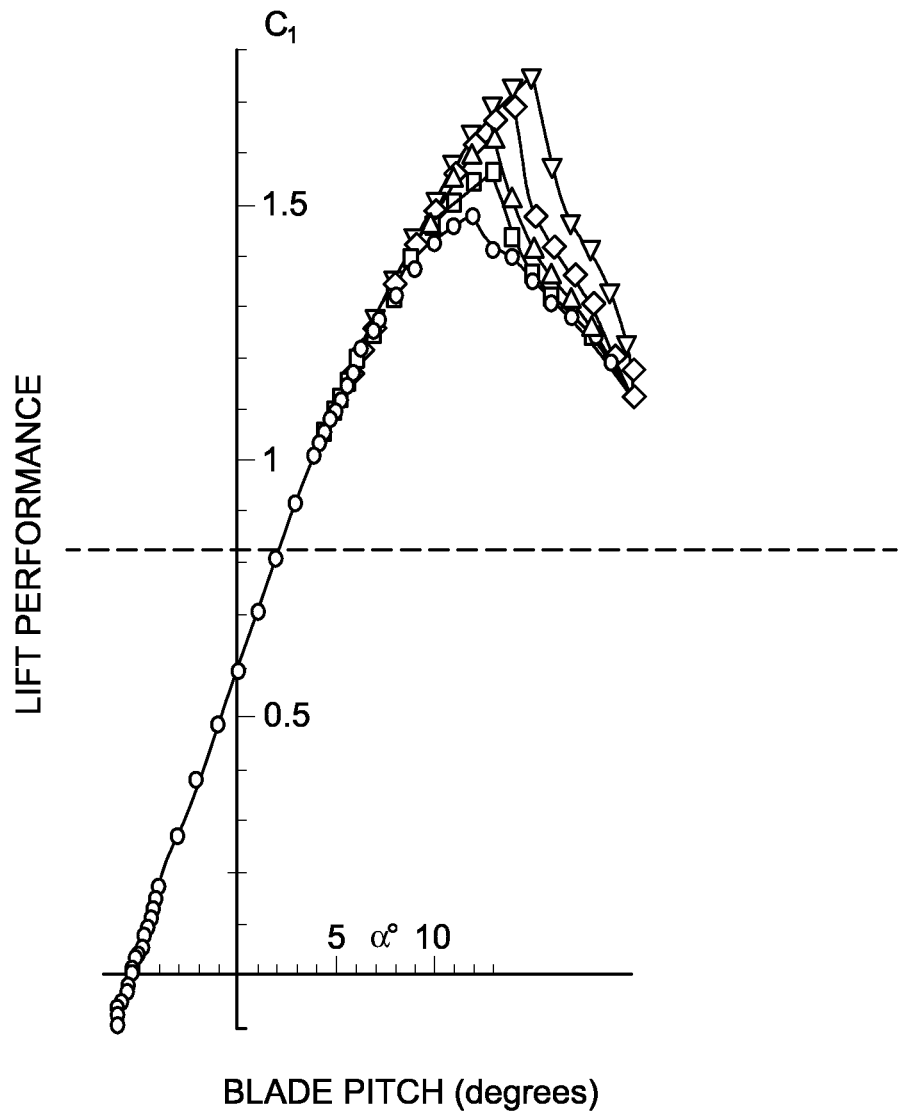
FIG. 4 illustrates a chart that plots lift performance of a wind turbine as a function of blade angle of attack.

Lift, drag, and moment characteristics of an airfoil profile change as a function of the Reynolds number. FIG. 4 illustrates a graph 250 that plots blade lift (unitless) as a function of blade angle of attack (in degrees) of the wind turbine 104 for a plurality of different Reynolds numbers (illustrated by different lines). Accordingly, the graph 250 demonstrates that different Reynolds numbers have different blade angles of attack; and consequentially different pitches where a maximum blade lift (and maximum power generation) is achieved. That is, the blade pitch that achieves a maximum lift (or near maximum lift) varies as a function of the Reynolds number calculated by Equations 1-4. Similarly, in examples not illustrated, the Reynolds number and airfoil profile also impact drag and moment behavior of the wind turbine 104. Accordingly, the Reynolds number provided for each wind turbine 104 can be employed by the K number of machine learning modules 142 to predict the relationship between the Reynolds number, the blade pitch, the rotor speed, wind speed and turbulence intensity for the wind turbine.

Referring back to FIG. 2, the AI ensemble engine 140 can include a model selector 144 that can select a particular machine learning module 142 based on a calculated efficiency metric. The model selector 144 can access sample data 146 that includes a set of known measured results (e.g., about 1 million examples). The model selector 144 can randomly split the sample data into two (2) portions, one (1) portion for training (referred to as a training set) the machine learning modules 142, and one (1) portion for calculating a fitness metric (e.g., accuracy) of a resulting model. The training set of the sample data 146 can be provided to each of the K number of machine learning modules 142, which can be set to default parameters. Each of the K number of machine learning modules 142 can output a model based on the training data. Each model output by the K number of machine learning modules 142 can characterize operation of each of the N number of wind turbines 104 for each of the M number of windfarms 102.

The model selector 144 can include an accuracy calculator 148 that can calculate an error for each model generated by the K number of machine learning modules 142. The error could be, for example, a fitness (e.g., a goodness of fit) of each model based on an error of a Key Performance Indicator (KPI) (e.g., power generation) of each model such as a relative error, a root mean squared (RMS) error, a squared correlation coefficient, an absolute error, etc.

To calculate the fitness of each model, the accuracy calculator 148 can employ the second portion of the sample data 146 to measure the error of the KPI. For each model output by the K number of machine learning modules 142, the accuracy calculator 148 can execute a 5-fold split validation on each model output by the K machine learning modules 142 based on the second portion of the sample data 146. Stated differently, the second portion of the sample data 146 is a random sub-sampled dataset that has not been used in the training from the original overall dataset, and the accuracy calculator 148 can determine an error for each model for each of five (5) sub-portions of the overall sample data 146. The results of the 5-fold split validation can correspond to a fitness metric (accuracy) for each of the 5-folds of validation of each model with a time stamp. That is, in the 5-fold validation, the accuracy calculator generates five (5) fitness metrics and time stamps for each of the K models generated by the K number of machine learning modules 142.

Moreover, the model selector 144 can include an efficiency calculator 150 that can calculate a computational resource execution cost of each model. The computational resource execution cost can average the five (5) fitness metrics for each model and calculate an estimated time for execution based on the time stamps of each of the five (5) fitness metrics and a fixed hardware allocation for each model. The efficiency calculator 150 can generate an efficiency metric that is the ratio of the averaged fitness metric for each model and the estimated time for execution. The model selector 144 can select the model from the K number of models generated by the K number of machine learning modules 142 that has a highest efficiency metric for a simulation.

The model with the highest efficiency metric may be the model that has a shortest computation time to deliver "higher accuracy faster" when executing detail modeling. As one example, it is presumed that a first model has an accuracy of 90% at with default settings, and the computational resource cost is estimated to be 5 minutes. Continuing with this example, it is presumed a second model has an accuracy of 80% with a computation resource cost estimated to be 10 minutes. In such a situation, the first model is selected by the model selector 144 since the accuracy and computational resource cost indicates that a relatively small range of combination of parameters for the first model are needed to tune performance of the wind turbines 104 (through the simulation) to level that operates within the 90% range predicted by the first model as compared to the second model. It is noted that there is no guarantee that the simulation of the first model's final tuned answer (recommended operating parameters) after three hours computation is going to be better than an answer (recommended operating parameters) from the second model if the range of parameters in the simulation is wider and there an extended time of computation (e.g., 24 hours or more). However, there is also no guarantee at this point that second model will ever deliver accuracy above 90%.

Furthermore, it is noted that accuracy provides diminishing returns at a reported accuracy of 95% or above. Accordingly, in situations where the accuracy of the first model is 95.5% with a computation resource cost of 10 minutes and the second model has an accuracy of 97% and a computation resource cost of 20 minutes, the model selector 144 can select the first model to avoid incurring exceptionally high computational costs.

The model selector 144 can provide the selected model to a simulator 152. The simulator 152 can execute a simulation of the selected model with a range of variations of the environmental data to determine recommended operating parameters (e.g., blade pitch and rotor speed or a plurality of combinations of blade pitch and rotor speed) for the N number of wind turbines 104 of each of the M number of windfarms 102 that achieve an increase in power generation for a different number of environmental conditions.

Further, the simulator 152 can be configured/programmed such that the recommended operating parameters for each of the wind turbines 104 are tuned to a level that balances power generation against component reliability. For instance, in many examples, setting a rotor speed for a given wind turbine 104 to a particularly high level might both increase power generation for the given wind turbine 104 and increase the likelihood of a component failure (e.g., pitch motor failure, rotor failure, etc.) of the given wind turbine 104. The simulator 152 is programmed to balance these competing interests and provide such that the recommended operating parameters for each of the wind turbine elevates power generation without significantly impacting component failure of the wind turbines 104. Additionally or alternatively, in some examples, the range of parameters for the N number of wind turbines 104 evaluated by the simulator 152 can be selected to allow simulation of the N number of wind turbines 104 to operate on a mid-to-low range of a power generation curve. In this manner, the likelihood that the recommended operating parameters exceed design limits/recommendations for each of the N number of wind turbines 104 can be curtailed.

The recommended operating parameters for each of the N number of wind turbines 104 for each of the M number of windfarms 102 can be provided to the server system 120 via the utility network 112. The server system 120 can upload the recommended operating parameters for each of the N number of wind turbines 104 at each of the M number of windfarms 102 at an appropriate time (e.g., during a downturn in wind and/or periodically) to each turbine controller 108. For instance, in some examples, the server system 120 can upload the recommended operating parameters for each of the wind turbines 104 within a given windfarm 102, such that the server system 120 updates each of the M number of windfarms 102 incrementally. In response, each turbine controller 108 can change the operating parameters to the recommended operating parameters.

Additionally, each turbine controller 108 continues to provide updated turbine operating data for the corresponding wind turbine 104 to the turbine tuning server 130. In response, the environmental engine 138 can update the Reynolds number for each of the wind turbines 104 (or some subset thereof). Additionally, data such as the power output by each wind turbine 104 can be employed by each machine learning module 142 and/or the simulator 152 of the AI ensemble engine 140 to update each generated model and the simulation of the selected model. That is, a portion of the measured samples can be employed to update training data for the machine learning modules 142, and another portion of the measured samples can be employed to update the validation executed by the model selector 144 and yet another portion of the measured samples can be employed to update the simulator 152. For example, if the recommended operating parameters for a given wind turbine 56 predicted an increase of power generation of about 1%, but the turbine operating data for the given wind turbine 104 indicates that power generation actually increased by about 3%, the simulator 152 and the machine learning module 142 that generated the selected model can be updated to reflect the updated measured conditions.

Upon updating the simulator 152 and/or each machine learning module 142 (or some subset thereof), the model selector 144 can re-execute the selection of a model, and the simulator 152 can generate an updated set of recommended operating parameters for each of the N number of wind turbines 104 for each of the M number of windfarms 102 that can be provided to the server system 120. In response, the server system 120 can upload the recommended operating parameters to each of the N number of turbine controllers 108. In this manner, performance (e.g., predicted accuracy) of the AI ensemble engine 140 improves over time through the employment of feedback.

Additionally, through employment of the feedback, the operation of the AI ensemble engine 140 compensates for degradation in performance (e.g., due to blade degradation from surface degradation and/or cracking) of the N number of wind turbines 104 over time. More particularly, the AI ensemble engine 140 adjusts the K number of machine learning modules 142 and/or the simulator 152 based on feedback characterizing updated turbine operating data from each of the wind turbines 104 generated in response to the setting of the operating parameters for the plurality of wind turbines 104 to the recommended operating parameters. As an example, the simulator 152 and/or each machine learning module 142 (or some subset thereof) can be configured/programmed such that if the predicted power generation for a given wind turbine 104 is higher than an actual (measured) power generation, future predictions of power generation are reduced (over time) accordingly.

By employment of the system 100, the operating parameters of each of the N number of wind turbines 104 for each of the M number of windfarms 102 can be set to a level that elevates power generation without unnecessarily increasing maintenance costs of the windfarm 102. That is, the operating parameters of the N number of wind turbines 104 for each of the M number of windfarms 102 can be tuned to enhance the operation of the wind turbines 104.

Additionally, although FIG. 2 illustrates a plurality of wind turbines 104 (N number of wind turbines 104 operating at M number of windfarms 102) it is understood that in some examples, the turbine tuning server 130 can be implemented on a portable unit (e.g., a mobile computing device) and connected to a single wind turbine controller 108. In this manner, the turbine tuning server 130 can be employed to tune the operating parameters for a single wind turbine 104.

Figure 5:
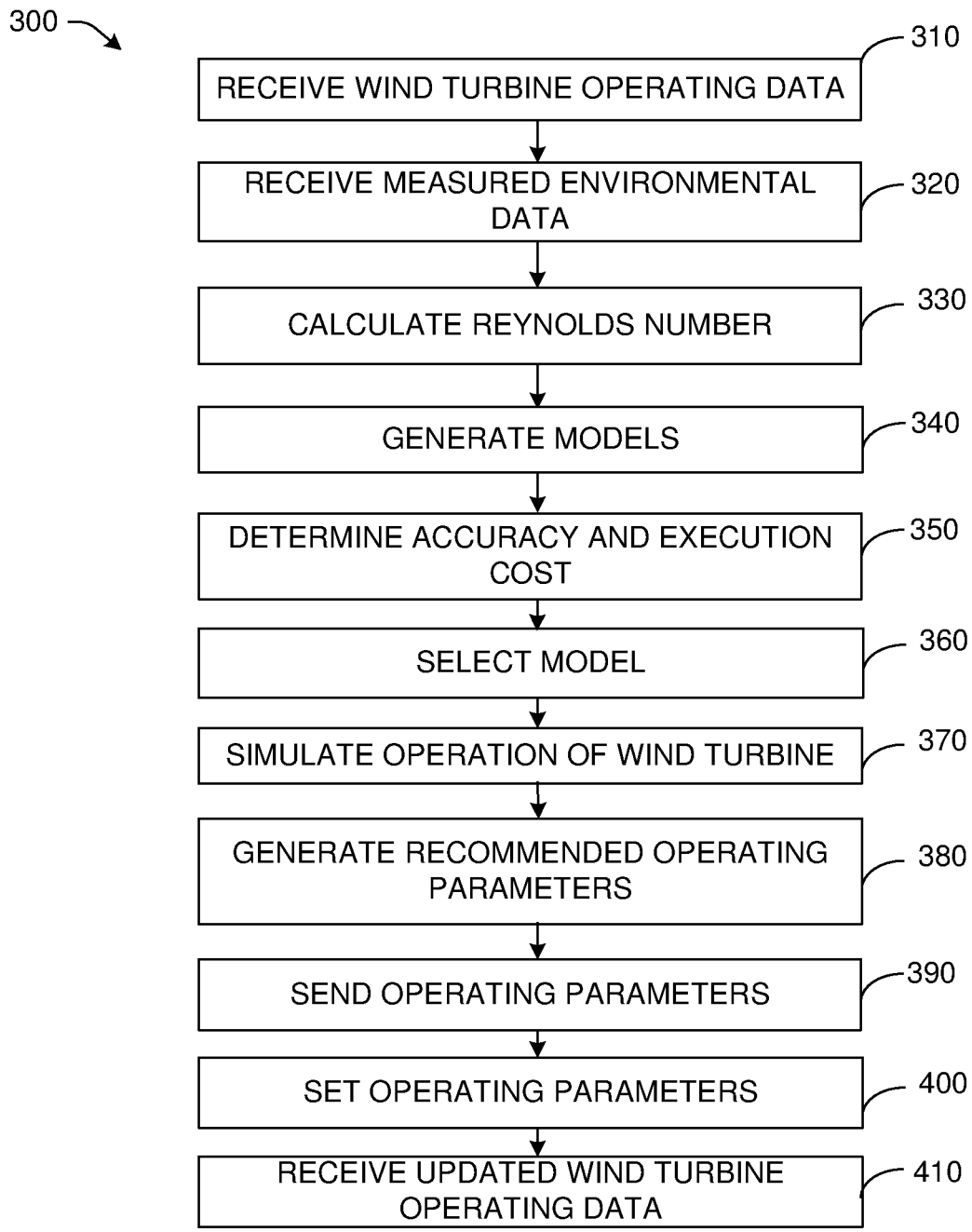
FIG. 5 illustrates a flowchart of an example method for controlling a wind turbine.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a flow diagram of an example method 300 for controlling operation of a wind turbine (or multiple wind turbines) in an electric power generation system. The method 300 can be implemented by electric power generation system 50 of FIG. 1 and/or the electric power generation system 100 of FIG. 2. Moreover, for purposes of simplification of explanation, the method 300 is described as controlling the operating parameters for a single wind turbine. However, the actions of the method 300 can be scaled to operate multiple wind turbines in a single windfarm (as illustrated in FIG. 1) or multiple wind turbines in multiple windfarms (as illustrated in FIG. 2).

At 310, a turbine tuning server (e.g., the turbine tuning server 54 of FIG. 1 and/or the turbine tuning server 130 of FIG. 2) can receive turbine operating data from a turbine controller (e.g., one of the turbine controllers 60 of FIG. 1 and/or the turbine controllers 108 of FIG. 2). The turbine operating data can characterize an operational state of the wind turbine. At 320, the turbine tuning server can receive environmental data characterizing measured ambient conditions of a region that includes the wind turbine (e.g., a windfarm).

At 330, an environmental engine (the environmental engine 62 of FIG. 1 and/or the environmental engine 138 of FIG. 2) can calculate a Reynolds number for the wind turbine using Equations 1-4. At 340, an AI ensemble engine (e.g., the AI ensemble engine 68 of FIG. 1 and/or the AI ensemble engine 140 of FIG. 2) calculates a model for the wind turbine using a plurality of different machine learning algorithms (e.g., six (6)). The model for the wind turbine can be based on the turbine operating data, the measured environmental data mechanical data characterizing mechanical properties of the wind turbine, and other information. At 350, the AI ensemble engine can determine an accuracy and a computational resource cost for each model. At 360, the AI ensemble engine can select a model with a highest efficiency metric that corresponds to a ratio of the accuracy and computational resource cost for each model.

At 370, the AI ensemble engine can simulate operation of the wind turbine based on the selected model. The simulation can include varying environmental conditions and operational parameters to simulate the power generation of the wind turbine and to simulate "wear and tear" on the wind turbine. At 380, the AI ensemble engine generates recommended parameters for the wind turbine based on the simulation. The recommended parameters balance the need for increased power generation against the impact on maintenance of the wind turbine. At 390, a SCADA system (e.g., the server system 52 of FIG. 1 and/or the server system 120 FIG. 2) sends operating parameters to the turbine controller for the wind turbine based on the recommended parameters provided from the AI ensemble engine. At 400, the turbine controller sets operating parameters for the wind turbine in response to the receipt of the operating parameters from the SCADA.

At 410, updated turbine operating data can be received at the turbine tuning server. The updated turbine operating data can be employed to repeat the method 300 (or some portion thereof). In particular, upon receipt of the updated turbine operating data, in some examples, the method 300 can return to 320 or 330 such that the updated turbine operating data can be employed as feedback.

Figure 6:
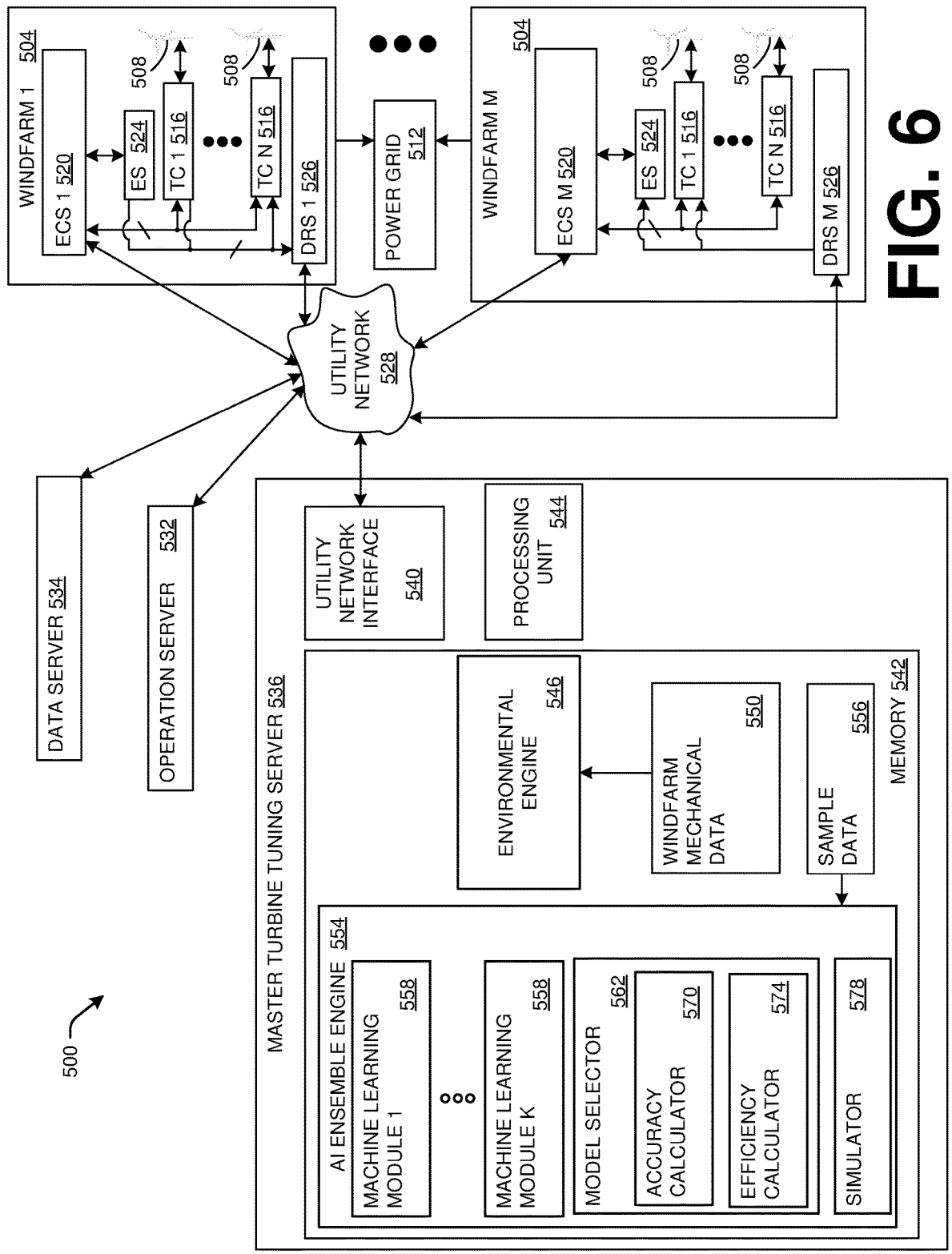
FIG. 6 illustrates a block diagram of an example of an electric generation system with a turbine tuning server that can tune operating parameters of a plurality of wind turbines at a plurality of windfarms.

FIG. 6 illustrates another example of an electric power generation system 500 that can tune the operating parameters of wind turbines. The electric power generation system 500 can include M number of windfarms 504 that can generate electric power, where M is an integer greater than or equal to two. Each of the M number of windfarms 504 can include N number of wind turbines 508, where N is an integer greater than or equal to two. Each of the M number of windfarms 504 can be implemented in a manner similar to the windfarm 58 of FIG. 1. Moreover, each of the M number of windfarms 504 can have a different (or the same) number of wind turbines. Similar to FIG. 2, for purposes of simplicity of explanation, each wind turbine 508 can be associated with an index number that can uniquely identify the wind turbine 508 with a windfarm number and a wind turbine number. For instance, the first wind turbine 508 in the first windfarm 102 can be referenced as wind turbine (1,1). Similarly, the Nth wind turbine 104 of the Mth windfarm 504 can be referenced as wind turbine (M, N). Accordingly, each of the M number of windfarms 504 can include a subset of the total number of wind turbines 104 grouped together in geographic proximity.

Each of the M number of windfarms 504 can provide power to a power grid 512. For purposes of simplification of explanation, power distribution infrastructure such as inverters, substations, feeders and transformers are omitted from view. Each windfarm 504 can include N number of turbine controllers 516 (TC). Accordingly, each turbine controller 516 can be assigned the same index number as the corresponding wind turbine. Therefore, the Nth turbine controller 516 of the Mth windfarm 102 can be referenced as turbine controller (M, N). Each turbine controller 516 can be implemented, for example, as a PLC.

Each of the M number of windfarms 504 includes an edge computing system 520 (labeled ECS 1 . . . ECS M) that is logically and physically situated at a location proximal to the corresponding windfarm 504. Moreover each turbine controller 516 communicates with the corresponding edge computing system 520. Each edge computing system 520 controls operations on each corresponding turbine controller 516. For instance, the first edge computing system 520 (e.g., ECS 1) controls operations of the turbine controllers 1-N of the first windfarm 504 (windfarm 1). Additionally, each edge computing system 520 collects turbine operating data (e.g., operating parameters and/or sensor data) from each corresponding turbine controller 516 characterizing a state of a corresponding wind turbine 508. The turbine operating data can include data characterizing an operational state of the corresponding wind turbine 508, such as on, off, rotor speed, blade pitch, power output, etc. The edge computing system 520 generates a record of parameter updates for the corresponding wind turbines 508 and environmental data updates provided from a corresponding environmental sensor 524 (ES).

More particularly, each windfarm 504 can also include an environmental sensor 524 that can be representative of a plurality of environmental sensors 524. Each environmental sensor 524 can measure ambient conditions for a corresponding windfarm 504, such as wind speed, temperature, pressure and relative humidity. Each environmental sensor 524 can output measured environmental data that characterizes the measured ambient conditions of the corresponding windfarm 504 to the corresponding edge computing system 520. In some examples, the environmental sensors 524 can be representative of sensors external to the corresponding windfarm 504. For instance, in some examples, the environmental data can be provided from a nearest meteorological station (weather station) that manages the environmental sensors 524.

Each wind farm 504 can also include a data repository system 526, (labeled "DRS" in FIG. 6) such that there are M number of data repository systems 526. Each data repository system 526 communicates with each turbine controller 516 within a respective wind farm 504 and with the corresponding environmental sensor 524. More particularly, the data repository system 526 at each windfarm 504 can collect operational data from each turbine controller 516. Similarly, in some examples, the data repository system 526 at each windfarm 504 can collect environmental data from the respective environmental sensor 524.

Each data repository system 526 can be implemented with a SCADA system, a search and query (SQL) server, an open platform communication (OPC) server or a combination thereof. For instance, in one example, a SCADA system or a SQL server can collect data, and an OPC server can communicate data to external devices. That is, in some examples, operations of each data repository system 526 (or some subset thereof) can be distributed among multiple systems.

The M number of edge computing systems 520 and the M number of data repository systems 526 can communicate on a utility network 528. The utility network 528 can be a communications network. The utility network 528 can be a public network (e.g., the Internet), a private network (e.g., a proprietary network) or a combination thereof (e.g., a private network coupled to the Internet). The utility network 528 can provide bi-directional communication between nodes of the utility network 528.

The electric power generation system 500 can include an operation server 532 and a data server 534 that communicates on the utility network 528. The operation server 532 and/or the data server 534 can be representative of a server operated by a utility provider, such as a utility provider for the power grid 512. In various examples, the operation server 532 and the data server 534 can be operating different service instances in a computing cloud. In still other examples, a single server instance can execute software that provides the combined functionality of the operation server 532 and the data server 534.

In some examples, the data repository system 526 of each windfarm 504 provides the ingested environmental data and operational data to the operation server 532. In this manner, the operation server 532 stores the operational data for each of the N number of wind turbines 508 at each of the M number of wind farms 504. Additionally, the operation server 532 stores the environmental data for each of the M number of wind farms 504. Further, in some examples, the edge computing system 520 of each of the M number of windfarms 504 provides the record of parameter updates and overall system health to the data server 534. In response, the data server 534 generates historical records with data characterizing parameters assigned to the turbine controller 516 and overall system health. As changes are made to operating parameters of the wind turbines 508, and/or the sensor data, these changes are recorded in the turbine operating data, and added to the historical records for the corresponding windfarm 504.

A master turbine tuning server 536 (e.g., a computing device) can also be connected to the utility network 528 via a utility network interface 540 (e.g., a network interface card). The master turbine tuning server 536 can be implemented by a utility provider (e.g., a power provider), such as a utility provider that controls the M number of windfarms 504. The master turbine tuning server 536 can include memory 542 to store machine executable instructions. The memory 542 can be implemented as a non-transitory machine readable medium. The memory 542 could be volatile memory (e.g., random access memory), non-volatile memory (e.g., a hard drive, a solid state drive, flash memory, etc.) or a combination thereof. The master turbine tuning server 536 can include a processing unit 544 (e.g., one or more processor cores) that accesses the memory 542 and executes the machine readable instructions.

The master turbine tuning server 536 can be (physically) implemented at facilities controlled by the utility provider, such as in a cloud computing system. In such a situation, features of the master turbine tuning server 536, such as the processing unit 544, the utility network interface 540, and the memory 542 could be representative of a single instance of hardware or multiple instances of hardware with applications executing across the multiple of instances (i.e., distributed) of hardware (e.g., computers, routers, memory, processors, or a combination thereof). Alternatively, the master turbine tuning server 536 could be implemented on a single dedicated computing device.

The memory 542 stores application software for tuning operations of each of the N number of wind turbines 508 deployed at the M number of windfarms 504. For example, the memory 542 stores application software for monitoring, analyzing and determining recommended operating parameters for each of the wind turbines 508 in a manner described herein.

The memory 542 includes an environmental engine 546 executing thereon. The environmental engine 546 can receive windfarm mechanical data 550 that characterizes mechanical properties of each of the N number of wind turbines 508 in each of the windfarms 504. The mechanical properties can include, for example, blade properties of each wind turbine 508, including rotor diameter, blade span, airfoil profiles, chord lengths, and/or twist angle of the blades. Additionally, the operation server 532 provides collected operational data for each of the N number of wind turbines 508 at each of the M number of windfarms 504 (or some subset thereof) to the environmental engine 546. Similarly, the operation server 532 provides environmental data for each of the M number of windfarms 504 (or some subset thereof) to the environmental engine 546. Further, historical records characterizing the operating parameters and system health for the M number of windfarms 504 is provided to the environmental engine 546 from the data server 534. In these situations, data provided by the operation server 532 and/or the data server 534 can be updated periodically and/or asynchronously.

The environmental engine 546 can generate a mathematical model characterizing the ratio of inertial to viscous forces that are interacting with a surface of airfoils of a wind turbine 508. More particularly, the environmental engine 546 can employ the turbine operating data, the measured environmental data, the windfarm mechanical data and other predetermined characteristics of each of the M number of windfarms 504 (e.g., gas constant for dry air, the gas constant of water vapor and pressure, etc.) to generate performance metrics for each individual wind turbine 508 among the M number of windfarms 504. These operational parameters of each wind turbine 508 include a Coefficient of Performance, Cp, a Tip Speed Ratio, TSR, a blade pitch average, $\beta_{mean}$ or some subset thereof. The performance metrics can, in turn, be employed to calculate operating parameters such as blade pitch, rotor speed, cut-in speed, cut-out speed, for a corresponding wind turbine 508.

The aerodynamic performance of blades of the wind turbines 508 depends on characteristics of air flow. Equations 6 to 11 characterize examples of how performance metrics characterizing the wind flow are calculated for a given wind turbine 508 of the plurality of wind turbines 508 at the windfarms 504. Specifically, the Coefficient of Performance, Cp characterizes a general performance metric for a given wind turbine 508 using Equation 6.

$$C_p = \frac{P}{\frac{1}{2} * \rho * \left(\frac{1}{4} * \pi * D^2\right) * V^3} \qquad \text{Equation 6}$$

Wherein:
P is a measured turbine active power, in Watts (W) for the given wind turbine;
$\rho$ is the air density in kilograms per cubic meter (kg/m³) for the given wind turbine;
D is a rotor diameter, in meters (m) of the given wind turbine;
V is an estimated or measured wind speed, in meters per second (m/s) for the given wind turbine.

In some examples, the Tip Speed Ratio, TSR for the given wind turbine 508 can be extracted from a channel internal to a corresponding turbine controller 516 for the given wind turbine 508. In other situations, such as examples where the turbine controller 516 does not provide such an internal channel, the Tip Speed Ratio can be calculated with Equation 7.

$$TSR = \frac{\frac{D}{2} * \omega * \frac{2\pi}{60}}{V} \qquad \text{Equation 7}$$

Wherein:
D is the rotor diameter, in meters (m) of the given wind turbine;
$\omega$ is a measured rotor speed, in meters (m) for the given wind turbine; and V is the estimated or measured wind speed, in meters per second (m/s) for the given wind turbine.

As noted in Equations 6 and 7, the wind speed, V for the given wind turbine can be estimated or measured. When an estimated wind speed is employed, the value for the windspeed, V can be extracted from a channel internal to a corresponding turbine controller 516 for the given wind turbine 508 or from an external mathematical correction.

The blade pitch average, $\beta_{mean}$ of the given wind turbine 508 provides a arithmetic mean pitch value of blades in the given wind turbine at a given time. Equation 8 is employable to calculate the blade pitch average, $\beta_{mean}$ for the given wind turbine 508.

$$\beta_{mean} = \frac{1}{n} * \Sigma_{i=1}^{n} \beta_i \qquad \text{Equation 8}$$

Wherein:
$\beta_i$ is the blade pitch for the ith blade of the given wind turbine; and
n is the number of blades on the given wind turbine.

Additionally, the air density, $\rho$ for the given wind turbine 508 can be calculated with two different methods. In the first method, an elevation of the given wind turbine 508 is employed using Equations 9 and 10 to calculate the air density, $\rho$ for the given wind turbine 508.

$$\rho = \frac{P_A * M}{R * T} \qquad \text{Equation 9}$$

$$P_A = P_o * \left[1 - \left(\frac{L*H}{T_o}\right)\right]^{\frac{g*M}{R*L}} \qquad \text{Equation 10}$$

Wherein:
$P_A$ is calculated air pressure, in Pascals (P) of dry air for the given wind turbine, defined in Equation 10;
M is a molar mass of dry air, approximately equal to 0.0289654 kg/mol;
T is a measured absolute temperature, in Kelvin (K) for the given wind turbine; and
R is the universal gas constant of dry air, approximately equal to 8.31447 J/(mol K);
$P_0$ is a sea-level standard atmospheric pressure of 101325 Pa;
L is a temperature lapse rate of 0.0065 km/m;
H is a height, in meters (m) of a rotor of the given wind turbine above sea level;
g is gravity, approximately equal to 9.8066 m/s².

$$P_A = P_o * \left[1 - \left(\frac{L*H}{T_o}\right)\right]^{\frac{g*M}{R*L}} \qquad \text{Equation 10}$$

Wherein:
$P_A$ is calculated air pressure, in Pascals (P) of dry air for the given wind turbine;

As noted the air density, $\rho$ for the given wind turbine 508 can be calculated with two different methods. In the second method, the air density, p for the given wind turbine can be calculated with Equation 11. As compared with the first method for calculating the air density, $\rho$, the second method is calculated independent from the height of the given wind turbine 508.

$$\rho = \frac{1}{T}\left[\left(\frac{B}{R_0}\right) - \varphi P_w \left(\frac{1}{R_0} - \frac{1}{R_W}\right)\right] \qquad \text{Equation 11}$$

Wherein:
T is a measured absolute air temperature, in Kelvin (K) for the given wind turbine;
B is a measured air pressure correct to a hub height average, in Pascals (Pa);
$R_0$ is the gas constant for dry air, approximately equal to 287.05 J/KgK
$R_W$ is the gas constant of water vapor, approximately equal to 461.5 J/(kg*K)
$\varphi$ is the measured relative humidity; and
$P_w$ is the vapor pressure, approximately equal to 0.0000205 $e^{0.0631846*T}$ (Pa).

It is noted that in examples where the rotor speed for a particular wind turbine 508 is unmeasurable, the environmental engine 546 can calculate an estimated rotor speed based on a measured generator speed (which can be included in the turbine operating data) and a gearbox ratio (which can be included in the mechanical properties) for the wind turbine 508.

The performance metrics can be provided to an AI ensemble engine 554 executing in the memory 542. The AI ensemble engine 554 can include K number of machine learning modules 558 that each generate a model characterizing the performance of the N number of wind turbines 508 for the M number of windfarms 504. Each of the K number of machine learning modules 558 can implement a different type of machine learning technique (e.g., a different machine learning algorithm). As one example, there can be seven (7) machine learning modules 558 that execute respective machine learning algorithms, including but not limited to Deep Learning, Random Forest, Gradient Boost Tree, a Decision Tree Process, K Nearest Neighbor, Linear Regression and a Support Vector Machine. In other examples, a subset or superset of these machine learning techniques could be employed. In this manner, the AI ensemble engine generates a set of models (K number) for each of the N number of wind turbines 508 of the M number of windfarms 504.

The AI ensemble engine 554 can include a model selector 562 that can select a particular machine learning model from each set of models for each wind turbine 508 based on a calculated efficiency metric. The model selector 562 can access sample data 556 that includes a set of known measured results (e.g., about 1 million examples). The model selector 562 can randomly split the sample data into two (2) portions, one (1) portion for training (referred to as a training set) the machine learning modules 558, and one (1) portion for calculating a fitness metric (e.g., accuracy) of a resulting model. The training set of the sample data 556 can be provided to each of the K number of machine learning modules 558, which can be set to default parameters. Each of the K number of machine learning modules 558 can output a model based on the training data. Each model output by the K number of machine learning modules 558 can characterize operation of each of the N number of wind turbines 508 for each of the M number of windfarms 504.

The model selector 562 can include an accuracy calculator 570 that can calculate an error for each model generated by the K number of machine learning modules 558. The error could be, for example, a fitness (e.g., a goodness of fit) of each model based on an error of a Key Performance Indicator (KPI) (e.g., power generation) of each model such as a relative error, a root mean squared (RMS) error, a squared correlation coefficient, an absolute error, etc.

To calculate the fitness of each model, the accuracy calculator 570 can employ the second portion of the sample data 556 to measure the error of the KPI. For each model output by the K number of machine learning modules 558, the accuracy calculator 570 can execute a 5-fold split validation on each model output by the K machine learning modules 558 based on the second portion of the sample data 556. Stated differently, the second portion of the sample data 556 is a random sub-sampled dataset that has not been used in the training from the original overall dataset, and the accuracy calculator 570 can determine an error for each model for each of five (5) sub-portions of the overall sample data 556. The results of the 5-fold split validation can correspond to a fitness metric (accuracy) for each of the 5-folds of validation of each model with a time stamp. That is, in the 5-fold validation, the accuracy calculator generates five (5) fitness metrics and time stamps for each of the K models generated by the K number of machine learning modules 558.

Moreover, the model selector 562 can include an efficiency calculator 574 that can calculate a computational resource execution cost of each model. The computational resource execution cost can average the five (5) fitness metrics for each model and calculate an estimated time for execution based on the time stamps of each of the five (5) fitness metrics and a fixed hardware allocation for each model. The efficiency calculator 574 can generate an efficiency metric that is the ratio of the averaged fitness metric for each model and the estimated time for execution. The model selector 562 can select the model from the K number of models generated by the K number of machine learning modules 558 that has a highest efficiency metric for a simulation.

The model with the highest efficiency metric may be the model that has a shortest computation time to deliver "higher accuracy faster" when executing detail modeling. As one example, it is presumed that a first model has an accuracy of 90% at with default settings, and the computational resource cost is estimated to be 5 minutes. Continuing with this example, it is presumed that a second model has an accuracy of 80% with a computation resource cost estimated to be 10 minutes. In such a situation, the first model is selected by the model selector 562 since the accuracy and computational resource cost indicates that a relatively small range of combination of parameters for the first model are needed to tune performance of the wind turbines 508 (through the simulation) to level that operates within the 90% range predicted by the first model as compared to the second model. It is noted that there is no guarantee that the simulation of the first model's final tuned answer (recommended operating parameters) after three hours computation is going to be better than an answer (recommended operating parameters) from the second model if the range of parameters in the simulation is wider and there an extended time of computation (e.g., 24 hours or more). However, there is also no guarantee at this point that the second model will ever deliver accuracy above 90%.

Furthermore, it is noted that accuracy provides diminishing returns at a reported accuracy of 95% or above. Accordingly, in situations where the accuracy of the first model is 95.5% with a computation resource cost of 10 minutes and the second model has an accuracy of 97% and a computation resource cost of 20 minutes, the model selector 562 can select the first model to avoid incurring exceptionally high computational costs.

The model selector 562 can provide the selected model to a simulator 578. The simulator 578 can execute a simulation of the selected model with a range of variations of the environmental data to determine recommended operating parameters (e.g., blade pitch and rotor speed or a plurality of combinations of blade pitch and rotor speed) for the N number of wind turbines 508 of each of the M number of windfarms 504 that achieve an increase in power generation for a different number of environmental conditions.

Further, the simulator 578 can be configured/programmed such that the recommended operating parameters for each of the wind turbines 508 are tuned to a level that balances power generation against component reliability. For instance, in many examples, setting a rotor speed for a given wind turbine 508 to a particularly high level might both increase power generation for the given wind turbine 508 and increase the likelihood of a component failure (e.g., pitch motor failure, rotor failure, etc.) of the given wind turbine 508. The simulator 578 is programmed to balance these competing interests and ensure that the recommended operating parameters for each of the wind turbines 508 elevates power generation without significantly impacting component failure of the wind turbines 508. Additionally or alternatively, in some examples, the range of parameters for the N number of wind turbines 508 evaluated by the simulator 578 can be selected to allow simulation of the N number of wind turbines 508 to operate on a mid-to-low range of a power generation curve. In this manner, the likelihood that the recommended operating parameters exceed design limits/recommendations for each of the N number of wind turbines 508 can be curtailed.

The selected model and the recommended operating parameters for each of the N number of wind turbines 508 can be provided to the corresponding edge computing system 520 of each of the M number of windfarms 504. Responsive to the selected model and the recommended parameters for each corresponding N number of wind turbines 508, the edge computing system 520 can instantiate a virtual controller for each corresponding wind turbine 508. The virtual controller for each wind turbine can communicate with a corresponding turbine controller 516. More particularly, the edge computing system 520 can be configured to set the operational parameters of the virtual controller to match the operational parameters of the (actual) turbine controller 516. Moreover, changes to the operating parameters at the turbine controller 516 causes the turbine controller 516 to change the operating parameters of the corresponding wind turbine 508, and vice versa. In this manner, changes made to the operational parameters of the virtual controller are propagated to the corresponding virtual controller 516, which in turn changes the operating parameters of the corresponding wind turbine 508.

Additionally, the edge computing system 520 at each windfarm 504 provides updated records to the data server 534 periodically and/or asynchronously in response to updates of operating parameters and/or system health. The data server 534, in turn generates historical records characterizing the updates and system health. In turn, the data server 534 provides the historical records for the corresponding N number of wind turbines 508 to the master turbine tuning server 536. For example, because the virtual controllers of the edge computing system 520 have operating parameters that match the operating parameters of the turbine controller 516, the edge computing system 520 can store and upload the operating parameters of each virtual controller to the data server 534 as part of the historical records. In response to receipt of updated operating parameters and/or system health characterized by the historical records provided from the data server 534 and the operation server 532 to the environmental engine 546, the performance metrics (e.g., Coefficient of Performance, Cp, a Tip Speed Ratio, TSR, a blade pitch average, $\beta_{mean}$, etc.) can be updated for each of the wind turbines 508 (or some subset thereof) of the corresponding windfarm 504. In this manner, over time, the performance metrics for each wind turbine 508 of the M number of windfarms 504 is updated.

Additionally, data such as the power output by each wind turbine 508 can be employed by each machine learning module 558 and/or the simulator 578 of the AI ensemble engine 554 to update each generated model and the simulation of the selected model. That is, a portion of the measured samples can be employed to update training data for the machine learning modules 558, and another portion of the measured samples can be employed to update the validation executed by the model selector 562 and yet another portion of the measured samples can be employed to update the simulator 578. For example, if the recommended operating parameters for a given wind turbine 508 predicted an increase of power generation of about 1%, but the turbine operating data for the given wind turbine 508 indicates that power generation actually increased by about 3%, the simulator 578 and the machine learning module 558 that generated the selected model can be updated to reflect the updated measured conditions.

Upon updating the simulator 578 and/or each machine learning module 558 (or some subset thereof), the model selector 562 can re-execute the selection of a model, and the simulator 578 can generate an updated set of models and recommended operating parameters for each of the N number of wind turbines 508 for each of the M number of windfarms 504 that can be provided to the edge computing systems 520 operating thereon. In response, each edge computing system 520 can update the operating parameters at the virtual controller based on the updated recommended operating parameters for each of the corresponding N number of turbine controllers 516. In this manner, performance (e.g., predicted accuracy) of the AI ensemble engine 554 improves over time through the employment of feedback.

Additionally, through employment of the feedback, the operation of the AI ensemble engine 554 compensates for degradation in performance (e.g., due to blade degradation from surface degradation and/or cracking) of the wind turbines 508 over time. More particularly, the AI ensemble engine 554 adjusts the K number of machine learning modules 558 and/or the simulator 578 based on feedback characterizing updated turbine operating data from each of the wind turbines 508 generated in response to the setting of the operating parameters for the plurality of wind turbines 508 to the recommended operating parameters. As an example, the simulator 578 and/or each machine learning module 558 (or some subset thereof) can be configured/programmed such that if the predicted power generation for a given wind turbine 508 is higher than an actual (measured) power generation, future predictions of power generation are decreased (over time) accordingly.

By employment of the electric power generation system 500, the operating parameters of each of the N number of wind turbines 508 for each of the M number of windfarms 504 can be set to a level that elevates power generation without unnecessarily increasing maintenance costs of the windfarms 504. That is, the operating parameters of the N number of wind turbines 508 for each of the M number of windfarms 504 can be tuned to enhance the operation of the wind turbines 508.

Furthermore, each edge computing system 520 is configured to operate in a supervisory role. More particularly, each edge computing system 520 can examine the recommended operating parameters for each wind turbine 508 and determine if the recommended operating parameters are within an acceptable range. For instance, if the acceptable range for a pitch of a given wind turbine 508 is 1 to 5, and the recommended operating parameters provide a value of −1, the edge computing system 520 can override the recommended operating parameters and employ the default operating parameters instead. In the event that the operating parameters are outside an acceptable range, the edge computing system 520 can set the operating parameters to a default value extracted from a local database for the corresponding wind turbine 508. In these situations, after the recommended operating parameters for a given wind turbine 508 are updated, the corresponding edge computing system 520 re-examines the updated operating parameters and may (or may not) set the operating parameters to the updated recommended parameters.

Further still, the electric power generation system 500 is employable to accelerate the tuning of operating parameters for a newly deployed wind turbine 508 (or multiple newly deployed wind turbines 508) at an existing windfarm 504 or deployment of a new windfarm 504. For instance, in a first example (hereinafter, "the first example"), suppose that a new wind turbine 508 is being deployed in the first windfarm 504 (windfarm 1). In the first example, the edge computing system 520 can read parameters from a corresponding turbine controller 516 for the newly deployed wind turbines 508. These parameters can be provided from the edge computing system 520 of the first windfarm 504 to the data server 534 and stored as historical records, which in turn are provided to the master turbine tuning server 536 via the utility network 528, along with a request for a model and recommended operating parameters for the newly deployed wind turbine 508. The tuned parameters of an older wind turbine 508 are employable by the edge computing system 520 on the newly deployed wind turbine 508. Accordingly, the newly deployed wind turbine 508 can operate with these parameters and operational data will be stored on the operation server 532 and with historical records on the data server 534. Operational data and historical records, in turn, are provided to the master tuning server 536 via the utility network 528 to create a new model and recommended parameters.

Responsive to the request for the model and the recommended operating parameters for the newly deployed wind turbine 508, the environmental engine 546 examines the windfarm mechanical data 550 and identifies an existing (previously deployed) wind turbine 508 that most closely resembles the newly deployed wind turbine. This determination can be based, for example, on a combination of environmental conditions and mechanical properties of the newly deployed wind turbine (e.g., rotor diameter, blade span, height, etc.). In response to determining the closest existing wind turbine 508 (which may or may not be on the same windfarm 504 as the newly deployed wind turbine 508), the environmental engine 546 selects the model and recommended parameters associated with the closest existing wind turbine 508. Additionally, the environmental engine 546 provides the selected model and the selected recommended parameters (generated for the closest existing wind turbine 508) to the edge computing system 520 for the newly deployed wind turbine 508.

Continuing with the first example, in response to receipt of the selected model and the selected recommended operating parameters, the edge computing system 520 instantiates a virtual controller for the newly deployed wind turbine and provides the recommended operating parameters to the corresponding turbine controller 516 for the newly deployed wind turbine 508. The model and the operating parameters for the newly deployed wind turbine 508 is monitored and updated in a manner similar to the process explained with respect an existing wind turbine 508 of the windfarm 504. Thus, over time, the recommended operating parameters and/or the model for the newly deployed wind turbine 508 are updated and tuned for the specific properties (e.g., manufacturing tolerances) of the newly deployed turbine 508.

In a second example (hereinafter, "the second example") a new windfarm 504 is deployed, such that multiple new wind turbines 508 are deployed contemporaneously. In this situation, the edge computing system 520 of the newly deployed windfarm 504 requests a model and recommended parameters for each wind turbine 508 at the newly deployed windfarm 504. In response to the request, the environmental engine 546 operates in a similar manner as the first example, and determines a closest existing wind turbine 508 for each wind turbine 508 at the newly deployed windfarm 504. In response to determining the closest existing wind turbine 508, for each respective wind turbine 508 of the newly deployed windfarm 504, the environmental engine 546 selects the model and recommended parameters associated with each respective closest existing wind turbine 508. Additionally, the environmental engine 546 provides the selected model and the selected recommended parameters (generated for the closest existing wind turbine 508) to the edge computing system 520 for each wind turbine 508 in the newly deployed windfarm 504, or some subset thereof.

Continuing with the second example, in response to receipt of the selected models and the selected recommended operating parameters for each wind turbine 508 of the newly deployed windfarm 504, the edge computing system 520 instantiates a virtual controller for each such wind turbine 508 and provides each such turbine controller 516 with the operating parameters of the corresponding virtual controller, as described. Accordingly, the models and the recommended operating parameters for the wind turbines 508 of the newly deployed windfarm 504 are monitored and updated in a manner described herein. Thus, over time, the recommended operating parameters and/or the model for the wind turbines 508 on the newly deployed windfarm 504 are updated and tuned for the specific properties (e.g., manufacturing tolerances) of the individual corresponding wind turbines 508.

Conventionally, there is a tuning period of three (3) to six (6) months to tune the operating parameters of a newly deployed wind turbine 508 to reach acceptable levels. Thus, during this tuning period, the newly deployed wind turbine 508 is operating at sub-optimal efficiency, such that power generation is limited and/or maintenance costs are exacerbated during this tuning period. By employment of the electric power generation system 500, using the model and operating parameters of an existing wind turbine 508 as the starting model and operating parameters for a newly deployed wind turbine 508, the tuning period can be curtailed considerably. For example, by setting the operating parameters for a given wind turbine 508 to the same operating parameters of a wind turbine 508 with the closest mechanical and environmental properties, the tuning period for newly deployed wind turbines 508 (which can be located an existing windfarm 504 or a newly deployed windfarm 504) can be reduced to several weeks or even days in certain situations. Thus, the overall efficiency of the electric power generation system 500 is increased.

Figure 7:
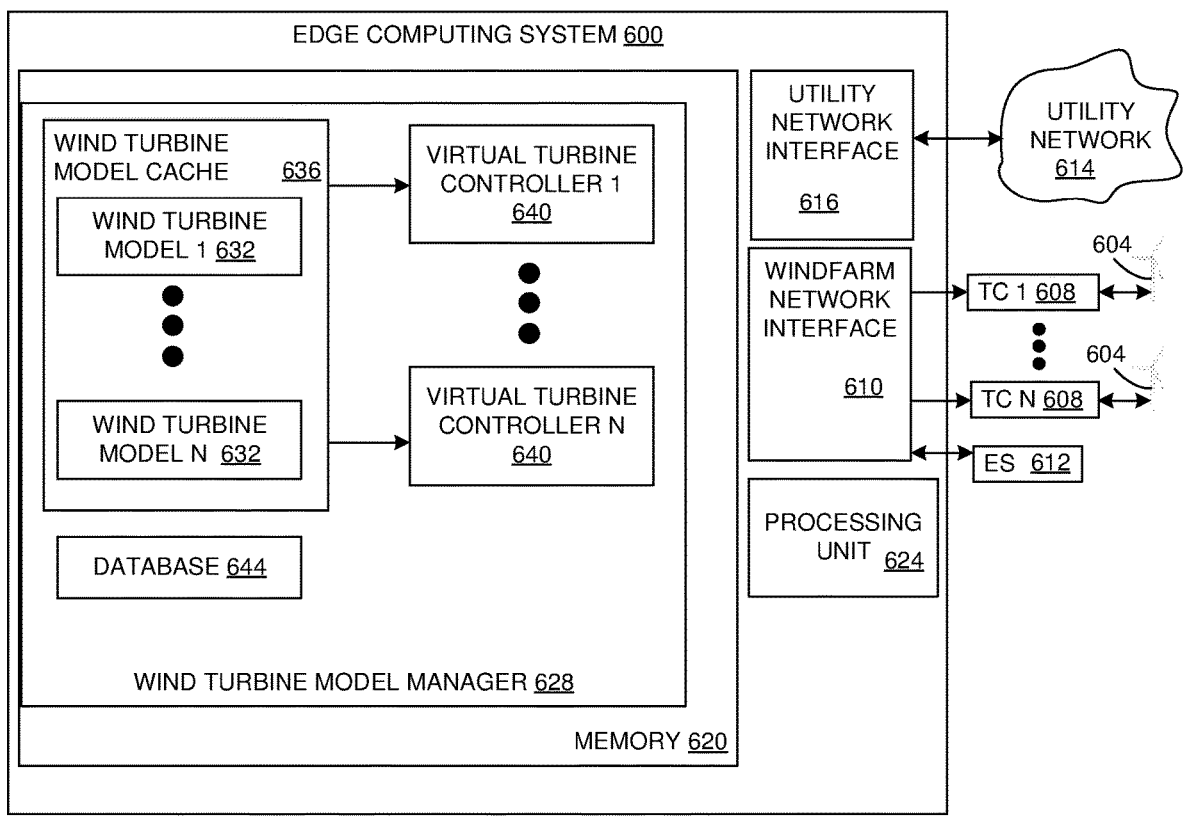
FIG. 7 illustrates an example of an edge computing system that is employable at a windfarm.

FIG. 7 illustrates an example of an edge computing system 600 that is employable as an instance of one of the M number of edge computing systems 520 of FIG. 6. Thus, the edge computing system 600 is physically and logically proximal to a windfarm with N number of wind turbines 604, where N is an integer greater than or equal to two. Each of the N number of wind turbines 604 is controlled by a corresponding turbine controller 608, such that there are N number of turbine controllers 608. In some examples, the edge computing system 600 includes a windfarm network interface 610 that enables communication with each of the N number of turbine controllers 608. The edge computing system 600 can be logically and physically coupled between a master turbine tuning server (e.g., the master turbine tuning server 536 of FIG. 1) and the N number of turbine controllers 608.

An environmental sensor 612 measures ambient conditions of the windfarm and provides the environmental parameters to the edge computing system 600 via the windfarm network interface 610. The environmental sensor 612 can be representative of a plurality of environmental sensors. The environmental sensor 612 can measure, for example wind speed, temperature, pressure and relative humidity or some subset thereof.

The edge computing system 600 communicates on a utility network 614 via a utility network interface 616 (e.g., a network interface card). The edge computing system 600 can include memory 620 to store machine executable instructions. The memory 620 can be implemented as a non-transitory machine readable medium. The memory 620 could be volatile memory (e.g., random access memory), non-volatile memory (e.g., a hard drive, a solid state drive, flash memory, etc.) or a combination thereof. The edge computing system 600 can include a processing unit 624 (e.g., one or more processor cores) that accesses the memory 620 and executes the machine readable instructions.

The memory 620 includes a wind turbine model manager 628. The wind turbine model manager 628 can receive data from each of the turbine controllers 608 and generate turbine operating data for each of the wind turbines 604 that is provided to the master turbine tuning server. The turbine operating data can characterize, for example, the operational state of each wind turbines 604.

The wind turbine model manager 628 receives N number of wind turbine recommended parameters and/or models 632 from the master turbine tuning server via the utility network interface 616. Each of the N number of wind turbine models 632 is generated by an AI ensemble engine, such as the AI ensemble engine 554 of FIG. 5. Each of the N number of wind turbine models 632 can be stored in a wind turbine model cache 636.

The wind turbine model manager 628 employs the N number of wind turbine models 632 to instantiate N number of virtual turbine controllers 640. Each of the N number of virtual turbine controllers 640 operates as a virtual instance of a corresponding turbine controller 608. Moreover, each virtual turbine controllers 640 is logically linked with the corresponding turbine controller 608 to have matching operating parameters. Thus, changes to operating parameters of a particular virtual controller 640 cause corresponding changes to the operating parameters of the corresponding turbine controller 608, and vice versa.

The N number of wind turbine models 632 can include data specifying recommended operating parameters of the corresponding turbine controller 608, as discussed herein.

The recommended operating parameters for each such wind turbine 608 can include blade pitch, rotor speed, cut-in speed, cut-out speed, etc. The wind turbine model manager 628 can employ these recommended operating parameters to populate the operating parameters of the N number of virtual turbine controllers 640, which are in turn, employed to set the (actual) operating parameters of the N number of turbine controllers 608.

Moreover, measurements from each of the N number of turbine controller 608 are provided to the corresponding virtual turbine controllers 640, which is used to update the turbine operating data of each of the wind turbines 604. Additionally, the wind turbine model manager 628 records updates to turbine operating parameters and/or overall system health. These records of updates to the turbine operating parameters and overall system health are provided to a data server (e.g., the data server 534 of FIG. 5), which in turn generates historical records for the windfarm and provides the historical records to the master turbine tuning server as feedback. The master tuning turbine server 536 employs the updated turbine operating data from the operation server 532 and the historical records from the data server 534 for each of the wind turbines 604 to update the N number of wind turbine models 632 or some subset thereof. Moreover, updates to the wind turbine models 632 cause updates to the operating parameters at N number of virtual turbine controllers 640, which in turn causes updates to the operating parameters of the N number of turbine controllers 608.

Summarily, the wind turbine model manager 628 is responsible for (i) instantiating the virtual turbine controllers 640 (ii) loading recommended operating parameters for each wind turbine 604 based on the operational data that is read from the turbine controller 608 and (iii) recording updating of the operating parameters and overall system health, which is employed by the data server to generate historical records for the windfarm.

Furthermore, the wind turbine model manager 628 of the edge computing system 600 is configured to operate in a supervisory role. More particularly, the wind turbine model manager 628 can examine the recommended operating parameters for each wind turbine 604 and determine if the recommended operating parameters are within an acceptable range. For instance, if the acceptable operating range for a pitch of a given wind turbine 604 is 1 to 5, and the recommended operating parameters provide a value of −1, the wind turbine model manager 628 can override the recommended operating parameters and employ the default operating parameters instead. In the event that the operating parameters are outside an acceptable range, the wind turbine model manager 628 can set the operating parameters to a default value extracted from a local database 644 (or other data structure) for the corresponding wind turbine 604. In these situations, after the recommended operating parameters for a given wind turbine 604 are updated (with an updated wind turbine model 632), the wind turbine model manager 628 re-examines the updated recommended operating parameters and may (or may not) set the operating parameters in the corresponding virtual controller 640 to the updated recommended parameters.

Employment of the edge computing system 600 at each windfarm enables the edge computing system 600 to closely monitor operations of the turbine controllers 608, such that the operating parameters and turbine operating data of the turbine controllers 608 are updated in real-time (e.g., within two minutes).

Figure 8:
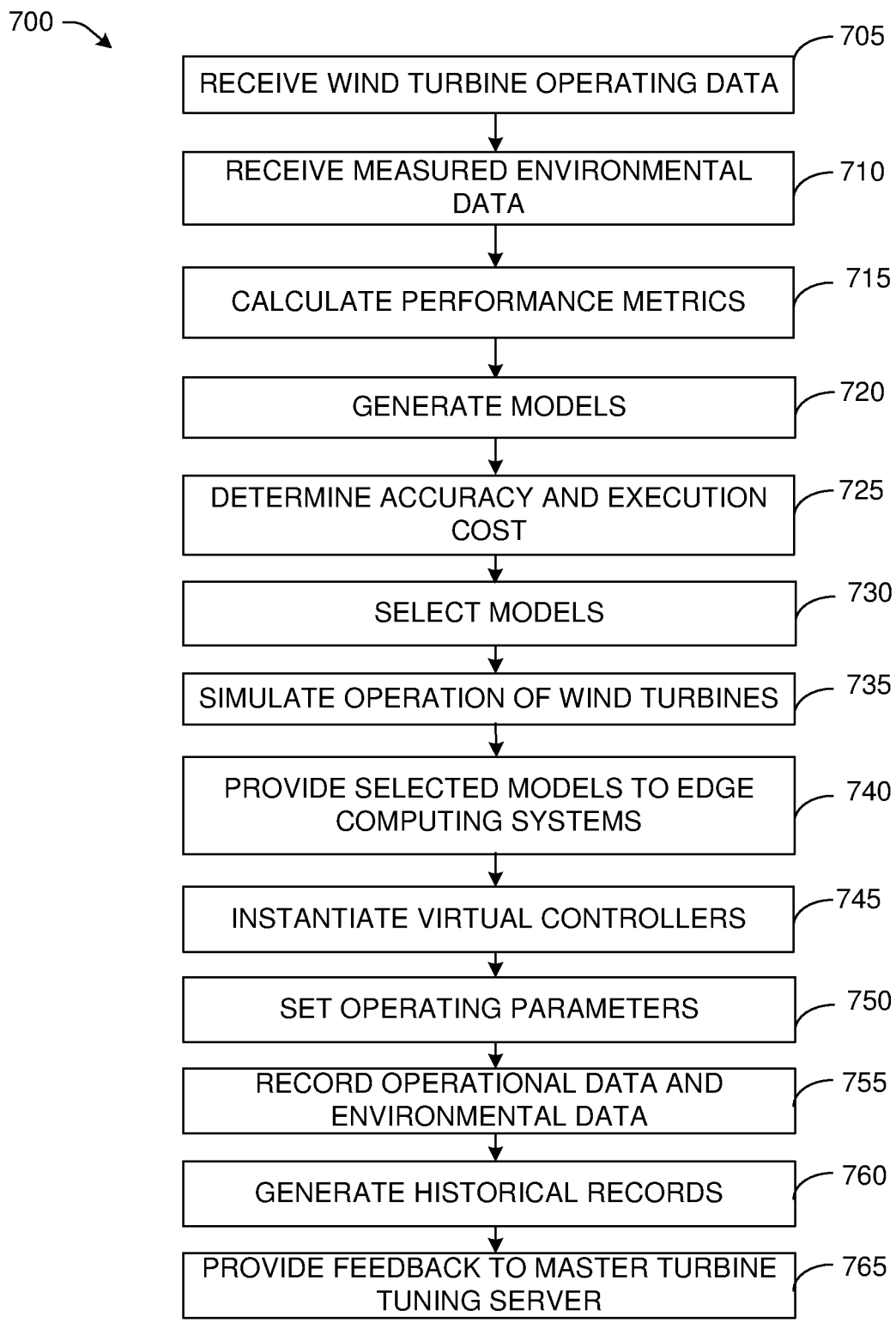
FIG. 8 illustrates a flowchart of an example method for controlling a plurality of wind turbines at a plurality of windfarms.

In view of the foregoing structural and functional features described above, an example method will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 8 illustrates a flow diagram of an example method 700 for controlling operation of a plurality of wind turbines distributed throughout a plurality of windfarms in an electric power generation system. In this manner, each of the windfarms includes a subset of the plurality of wind turbines. The method 700 can be implemented by the electric power generation system 500 of FIG. 6.

At 705, a master turbine tuning server (e.g., the master turbine tuning server 536 of FIG. 1) can receive turbine operating data from an operation server (e.g., the operation server 532 of FIG. 6) and/or from a data server (e.g., the data server 534 of FIG. 6). The turbine operating data can characterize an operational state of wind turbines at the corresponding subset of the plurality of wind turbines (e.g., the wind turbines at the corresponding windfarm). At 710, the master turbine tuning server can receive environmental data characterizing measured ambient conditions of a region that includes each windfarm from the operation server.

At 715, an environmental engine (the environmental engine 546 of FIG. 6) can calculate performance metrics for each of the plurality of wind turbines. The performance metrics of a respective wind turbine characterizes wind flowing over blades of the respective wind turbine. The performance metrics can include a performance coefficient, a tip speed ratio a blade pitch average, etc. In some examples, the performance metrics for a respective wind turbine can be calculated with equations 6-11. At 720, an AI ensemble engine (e.g., the AI ensemble engine 554 of FIG. 6) calculates a set of models for each of the plurality of wind turbines using a plurality of different machine learning algorithms (e.g., seven (7)). The set of models for each respective wind turbine can be based on the turbine operating data, the measured environmental data, mechanical data characterizing mechanical properties of the wind turbine, and other information. At 725, the AI ensemble engine can determine an accuracy and a computational resource cost for each model in each set of models. At 730, the AI ensemble engine can select a model in each set of models with a highest efficiency metric that corresponds to a ratio of the accuracy and computational resource cost for each model.

At 735, the AI ensemble engine can simulate operation of each of the plurality of wind turbines based on the selected model. The simulation can include varying environmental conditions and operational parameters to simulate the power generation of the wind turbine and to simulate "wear and tear" on each respective wind turbine. The simulation at 735 generates recommended parameters for the wind turbine based on the simulation. The recommended parameters balance the need for increased power generation against the impact on maintenance of the wind turbine.

At 740, the master turbine tuning server provides the selected models and the corresponding recommended operating parameters to the plurality of edge computing systems. In response, at 745, each of the plurality of edge computing systems instantiates a virtual controller for each corresponding subset of the plurality of wind turbines, namely, the wind turbines of the corresponding windfarm. At 750, the edge computing systems set the operating parameters for each of the plurality of virtual turbine controllers. In examples where the recommended operating parameters for a corresponding wind turbine are within an acceptable range for the corresponding wind turbine, the operating parameters are set to the recommended operating parameters. In examples where the recommended operating parameters are outside an acceptable range for the corresponding wind turbine, the operating parameters of the virtual turbine controller are set to default values for the corresponding wind turbine. The virtual controllers are configured such that setting parameters at a respective virtual controller causes a turbine controller to match the parameters of the corresponding virtual controller. At 755, the operation server records turbine operating data and environmental data provided from a data repository system (e.g., a SCADA system, a SQL server, a OPC server or some combination thereof) operating on each respective windfarm. At 760, the data server generates historical records characterizing operating parameters and overall system health based on periodic and/or asynchronous updates of the operating parameters and/or system health provided from the edge computing system. At 765, the turbine operating data, the environmental data, and the historical data records are provided to the master turbine tuning server as feedback.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for generating power comprising:
    an environmental engine, operating on one or more computing devices, determines a set of performance metrics characterizing a variance in a calculated wind flowing over blades of a plurality of wind turbines deployed at a plurality of windfarms based on measured wind speeds, and, wherein a performance metric, of the set of performance metrics, is associated with a first wind turbine of a first windfarm of the plurality of windfarms and characterizes the variance in the calculated wind flowing over blades of the first wind turbine based on the measured wind speed of the first wind turbine;
    an artificial intelligence (AI) ensemble engine operating on the one or more computing devices is configured to:
        generate a set of models for each wind turbine of the plurality of wind turbines based on the set of performance metrics, wherein each model of the set of models is generated with a different machine learning algorithm;
        select a model with a highest efficiency metric from the set of models for each turbine of the plurality of wind turbines;
        simulate execution of the selected model for each wind turbine of the plurality of wind turbines to individually determine recommended operating parameters for each of the plurality of wind turbines;
        provide to an edge computing system associated with the first windfarm, the edge computing system of a number of edge computing systems each operating at a corresponding windfarm of the plurality of windfarms, with the selected model and the recommended operating parameters for each wind turbine in the first windfarm; and
        receive turbine operating data characterizing operating conditions for a subset of wind turbines of the first windfarm.

2. The system of claim 1, wherein the AI ensemble engine comprises a simulator that determines the recommended operating parameters, including a blade pitch and a rotor speed, for the selected model for a second wind turbine of the first windfarm.

3. The system of claim 2, wherein the recommended operating parameters are selected to elevate power generation of the second wind turbine.

4. The system of claim 1, wherein the AI ensemble engine comprises a Linear Regression algorithm and a deep learning algorithm that each generate a respective model for the set of models.

5. The system of claim 1, wherein the performance metric of the set of performance metrics includes a coefficient of performance that varies as a function of a measured turbine active power, an air density, a rotor diameter and a wind speed for a second wind turbine.

6. The system of claim 5, wherein the air density for the corresponding wind turbine is based on a height of the second wind turbine.

7. The system of claim 6, wherein the air density for the second wind turbine is independent of a height of the second wind turbine.

8. The system of claim 1, wherein the set of performance metrics for the plurality of wind turbines comprises a tip speed ratio that varies as a function of a rotor diameter, a measured rotor speed and a wind speed.

9. The system of claim 1, wherein the set of performance metrics for the plurality of wind turbines comprises a blade pitch average, wherein the blade pitch average for a wind turbine is an arithmetic mean pitch value of blades of the wind turbine at a given time.

10. The system of claim 1, wherein the environmental engine receives a request for a model for a second wind turbine, and in response to the request, selects a model generated for the first wind turbine of the plurality of wind turbines based on a similarity of environmental conditions and mechanical properties of the second wind turbine and the first wind turbine.

11. The system of claim 1, wherein a virtual turbine controller is associated with each wind turbine of the plurality of wind turbines, and each virtual turbine controller has operating parameters that match operating parameters of a corresponding turbine controller coupled to a corresponding wind turbine of the plurality of wind turbines.

12. The system of claim 11, wherein operating parameters of a controller of a second virtual turbine is set to recommended operating parameters provided in a model if the recommended operating parameters are within an acceptable range, and to set operating parameters for the corresponding virtual turbine controllers to default values if the recommended operating parameters are outside the acceptable range.

13. A system for generating electric power comprising:
    an environmental engine, operating on one or more computing devices, determines a set of performance metrics characterizing a variance in a calculated wind flowing over blades of a respective on of a plurality of wind turbines deployed at a plurality of windfarms based on measured wind speeds, wherein a performance metric, of the set of performance metrics, is associated with a first wind turbine of a first windfarm of the plurality of windfarms and characterizes the calculated wind flowing over blades of the first wind turbine of the plurality of wind turbines that varies based on the measured wind speed of the first wind turbine;

an artificial intelligence (AI) ensemble engine operating on the one or more computing devices is configured to:
  generate a set of models for each wind turbine of the plurality of wind turbines based on the set of performance metrics, wherein each model of the set of models is generated with a different machine learning algorithm;
  select a model with a highest efficiency metric from the set of models for each turbine of the plurality of wind turbines; and
  simulate execution of the selected model for each wind turbine of the plurality of wind turbines to individually determine recommended operating parameters for each of the plurality of wind turbines; and a plurality of edge computing systems, wherein each edge computing system is proximal to a corresponding windfarm and each edge computing system instantiates a virtual turbine controller for each wind turbine in response to receipt of models for each wind turbine in the first windfarm, and each virtual turbine controller has operating parameters that match operating parameters of a corresponding turbine controller coupled to a corresponding wind turbine in the first windfarm.

14. The system of claim 13, wherein each edge computing system provides updates of turbine operating data, the turbine operating data characterizing an operating state of each wind turbine in a subset of wind turbines, wherein the updates of the turbine operating data are employed as feedback to the environmental engine.

15. The system of claim 13, wherein the AI ensemble engine comprises a simulator that determines the recommended operating parameters for the selected model, the recommended operating parameters including a blade pitch and a rotor speed for the corresponding wind turbine.

16. The system of claim 13, wherein the AI ensemble engine comprises a Linear Regression algorithm and a deep learning algorithm that each generate a respective model for the set of models.

17. The system of claim 13, wherein the performance metric of the set of performance metrics for the plurality of wind turbines comprises a coefficient of performance that varies as a function of a measured turbine active power, an air density, a rotor diameter and a wind speed for a corresponding wind turbine of the plurality of wind turbines.

18. The system of claim 13, wherein the AI ensemble engine adjusts the set of machine learning models and the simulator based on feedback characterizing updated turbine operating data generated by the plurality of edge computing systems in response to the setting of the operating parameters for the corresponding plurality of virtual turbine controllers to the recommended operating parameters such that the AI ensemble engine compensates for performance degradation at the plurality of wind turbines.

19. A method for controlling a system for generating electric power comprising:
  determining, by an environmental engine operating on one or more computing devices, a set of performance metrics characterizing a variance in a calculated wind flowing over blades of a respective on of a plurality of wind turbines deployed at a plurality of windfarms based on measured wind speeds, wherein a performance metric, of the set of performance metrics, is associated with a first wind turbine of a first windfarm of the plurality of windfarms and characterizes the calculated wind flowing over blades of the first wind turbine that varies based on the measured wind speed of the first wind turbine;
  generating, by an artificial intelligence (AI) ensemble engine operating on the one or more computing devices, a set of models for each wind turbine of the plurality of wind turbines, wherein each model of the set of models is generated with a different machine learning algorithm;
  selecting, by the AI ensemble engine, a model with a highest efficiency metric from the set of models for each turbine of the plurality of wind turbines;
  simulating, by the AI ensemble engine, execution of the selected model for each wind turbine of the plurality of wind turbines to individually determine recommended operating parameters for each of the plurality of wind turbines;
  receiving, at a plurality of edge computing systems the selected model and corresponding recommended parameters for each wind turbine of the plurality of wind turbines; and
  instantiating, by each edge computing system, a virtual turbine controller for each wind turbine in response to receipt of models for each wind, and each virtual turbine controller has operating parameters that match operating parameters of a corresponding turbine controller coupled to a corresponding wind turbine in the first windfarm.

20. The method of claim 19, further comprising:
  setting, by a given edge computing system, operating parameters of a second virtual controller to the recommended operating parameters for the selected model in response to determining the operating parameters are within an acceptable range; and
  setting, by the given edge computing system, operating parameters of another virtual controller to default values in response to determining that the recommended operating parameters the selected model are outside of an acceptable range.

* * * * *